United States Patent
Wakagi et al.

(10) Patent No.: US 8,208,038 B2
(45) Date of Patent: Jun. 26, 2012

(54) IMAGE SIGNAL PROCESSING DEVICE AND IMAGE SIGNAL PROCESSING METHOD

(75) Inventors: Toru Wakagi, Tokyo (JP); Tatsuya Deguchi, Kanagawa (JP); Makiko Baba, Kanagawa (JP)

(73) Assignee: Sony Corporation, Tokyo (JP)

( * ) Notice: Subject to any disclaimer, the term of this patent is extended or adjusted under 35 U.S.C. 154(b) by 528 days.

(21) Appl. No.: 11/914,784

(22) PCT Filed: Mar. 6, 2007

(86) PCT No.: PCT/JP2007/054357
§ 371 (c)(1), (2), (4) Date: May 21, 2008

(87) PCT Pub. No.: WO2007/108317
PCT Pub. Date: Sep. 27, 2007

(65) Prior Publication Data
US 2009/0066816 A1  Mar. 12, 2009

(30) Foreign Application Priority Data
Mar. 20, 2006  (JP) ................................ 2006-076914

(51) Int. Cl.
  *H04N 5/235* (2006.01)
  *H04N 5/228* (2006.01)
(52) U.S. Cl. ................................ 348/229.1; 348/222.1
(58) Field of Classification Search ............... 348/222.9, 348/229.1–230.1, 254–255, 362, 222.1
See application file for complete search history.

(56) References Cited

U.S. PATENT DOCUMENTS

| | | | | |
|---|---|---|---|---|
| 4,833,527 | A * | 5/1989 | Kondo | 348/675 |
| 6,141,047 | A * | 10/2000 | Kawai et al. | 348/254 |
| 2004/0080637 | A1* | 4/2004 | Nakamura et al. | 348/255 |
| 2006/0012808 | A1* | 1/2006 | Mizukura et al. | 358/1.9 |
| 2006/0017597 | A1* | 1/2006 | Jaspers | 341/155 |

FOREIGN PATENT DOCUMENTS

| | | |
|---|---|---|
| JP | 2001 189890 | 7/2001 |
| JP | 2002 33956 | 1/2002 |
| JP | 2004 363726 | 12/2004 |
| JP | 2006 148248 | 6/2006 |

* cited by examiner

*Primary Examiner* — Sinh Tran
*Assistant Examiner* — Mark Monk
(74) *Attorney, Agent, or Firm* — Oblon, Spivak, McClelland, Maier & Neustadt, L.L.P.

(57) ABSTRACT

A dynamic range is widened by effectively using an output range that is originally possessed by a solid-state image-capturing device, and an image having less color hue rotation is obtained.

By using the fact that the margin until the amount of saturation electric charge is reached becomes large as a result of the amount of exposure being set to be low in a high sensitivity mode, an RGB signal having a wide dynamic range containing signal components of a subject on the high-luminance side is obtained. First, γ correction close to a power γ is performed and thereafter, the signal is color-space-converted into a luminance signal and color-difference signals. A non-linear compression process is performed on the luminance signal so as to be fit into predetermined gradations, and for the color-difference signals, color rotation is reduced using a power gamma and color-difference matrix clipping is performed.

14 Claims, 15 Drawing Sheets

IMAGE SIGNAL PROCESSING DEVICE AND IMAGE SIGNAL PROCESSING METHOD

TECHNICAL FIELD

The present invention relates to an image signal processing apparatus for outputting a luminance signal and color-difference signals (Y/Cr/Cb, etc.) having an appropriate dynamic range on the basis of an image signal obtained from a solid-state image-capturing device and to an image signal processing method for use with the image signal processing apparatus. More particularly, the present invention relates to an image signal processing apparatus for widening a dynamic range by effectively using an output range that is primarily possessed by a solid-state image-capturing device and for obtaining an image having less color hue rotation and an image signal processing method for use with the image signal processing apparatus.

BACKGROUND ART

Cameras have a long history as means for recording visual information. In recent years, in place of silver-halide cameras for taking photographs by using a film and a photosensitive plate, digital cameras for digitizing an image by using a solid-state image-capturing device, such as a CCD (Charge Coupled Device) or a CMOS (Complementary Mental-Oxide Semiconductor) have become widely popular. Digital cameras have advantages as follows. Digitally coded images can be stored in a memory, image processing and image management using a computer can be performed, and there is no problem regarding the lifetime of a film.

A CCD sensor is configured by a scheme in which pixels (photodiodes) arranged in two dimensions convert light into electric charge by using a photoelectric effect. On the surface of each pixel, for example, a color filter of one of three colors of R (red), green (G), and blue (B) is provided, and signal electric charge corresponding to the amount of incident light through each color filter is stored. Then, signal electric charge corresponding to the amount of incident light of each color is read from each pixel, and the color of the incident light at each pixel position can be reproduced on the basis of each amount of each signal electric charge of the three colors. However, there is an upper limit in the amount of signal electric charge that can be stored by each pixel. There is a limitation that signal electric charge exceeding the amount of saturation electric charge of photodiodes constituting a pixel cannot be stored. That is, the range from the noise level possessed by a sensor device to the amount of saturation of electric charge that can be stored by the sensor device becomes a dynamic range. An image in a portion outside the dynamic range is observed as a phenomenon such that the captured image becomes overexposed or underexposed.

The human eye can sense brightness in correspondence with the number of digits of the amount of light, and the range, that is, the dynamic range, is said to be 8 digits. The dynamic range of a negative film is at least 4 digits. On the other hand, the dynamic range of a CCD is, for example, approximately 2.4 digits, and is insufficient. In recent years, with the advancement of microfabrication technology, the number of pixels in a solid-state image-capturing device has markedly increased. With the resolution power nearing that of silver-halide photographs, the amount of saturation electric charge has decreased with pixel size, and the problem of an insufficient dynamic range has become more serious.

A camera has a function of correcting the amount of light being received through the aperture and the shutter speed. For example, when the aperture is shut by one stop, the amount of light entering the camera is halved. If the amount of light that enters the camera is halved, the amount of light can be moved in parallel by the amount of 0.5 with respect to the logarithmic scale. However, the correction of the amount of light by the camera allows the distribution of the amount of light of a subject only to be moved in parallel within the dynamic range, and has no meaning with respect to the distribution of the amount of light wider than the dynamic range.

There is a known method of increasing the dynamic range by performing multiple recording and combining of images by changing the shutter speed. That is, under the control of an electronic shutter in a CCD sensor, an image in which saturation is avoided in a high-speed shutter process, and an image of a low-luminance portion made up of a sufficient number of electrons in a low-speed shutter process are obtained and combined, thereby ensuring a satisfactory dynamic range. However, image capturing needs to be performed two times, that is, a high-speed shutter process and a low-speed shutter process have to be performed, in order to obtain one image. Therefore, it is not possible to obtain an appropriate still image with respect to a moving object. Also, since a double image-capturing system becomes necessary, the configuration of the apparatus becomes complex.

Another method is considered in which sensors having a high sensitivity and sensors having a low sensitivity are alternately arranged in the sensor section, and a dynamic range is ensured by combining the information of the two types of sensors. However, there is a problem in that the sensor configuration and signal processing of sensor output becomes complex.

For example, a signal processing method for detecting the luminance distribution of a captured image, correcting the luminance distribution in which back light, white color loss, and underexposure occurred to an optimum luminance distribution, and outputting it has been proposed (refer to, for example, Patent Document 1). According to the signal processing method, when the luminance distribution of an output image is large, correction is made using a B-spline interpolation method so that the luminance distribution becomes uniform, making it possible to control the input/output of γ correction and to obtain an optimum image.

Furthermore, an automatic exposure control method (refer to, for example, Patent Document 2) has been proposed in which, when a high-luminance subject signal contained in an input image signal is detected, the amount of exposure used for an image-capturing operation is controlled in response to the high-luminance subject signal and also control of increasing the luminance level in a low-luminance region with respect to the amount of γ correction for the image signal is performed on the basis of the amount of exposure, thereby a satisfactory image is obtained, for example, from a video image in which a high-luminance subject and a low-luminance subject coexist in a back light state.

Furthermore, a method of ensuring a dynamic range of an image signal using γ correction is also considered. γ correction refers to a process in which, when a captured image is to be output to a monitor or the like, the relationship between data of colors of an image or the like and signals when the data is actually output is adjusted, and gradation (luminance) is correctly reproduced (as a more nature display). Gradation (luminance) characteristics on a monitor are not linear with respect to the level of an input signal from the CCD. If the input signal is denoted as x and the luminance level of a monitor is denoted as y, the relation of $y=x^\gamma$ holds. Accordingly, γ correction performs a process corresponding to this reverse function. A γ correction curve is primarily a function of a power, and a dynamic range can be ensured by changing a γ coefficient. However, there is a problem in that, in a captured image in a portion that has been separated from an ideal γ curve as a result of the change in the γ coefficient, negative effects occur, such as color balance is deteriorated and contrast deterioration occurs.

Furthermore, in the captured image using a solid-state image-capturing device, there is a problem in that color hue rotation such that colors are represented by a color differing from the original one in a high-luminance portion when overexposure occurs. For example, when the amount of signal electric charge corresponding to the amount of incident red light among the incident light exceeds the saturation electric charge of a photodiode, colors reproduced from each of the amount of signal electric charge of green and blue and the amount of signal electric charge (amount of saturation electric charge) of red, which do not reach the amount of saturation electric charge, become colors such that the degree of redness is insufficient. In particular, since the human eye is sensitive to flesh color, yellowing of flesh color becomes easily recognizable when flesh color is image-captured in overexposure.

As a method for avoiding this color hue rotation, for example, a method is considered in which levels of the color-difference signals are suppressed in a high-luminance portion where the image color rotation begins to occur. This is a technology that is commonly called "achromatization", and a process for erasing colors in a step-like manner when the luminance signal level reaches a threshold value or higher and causing the colors to be blown out to white is performed. However, since colors are lost, a problem occurs in that the image appears to have blown out to white.

As another method of avoiding color hue rotation, for example, clipping is performed so that a color-difference signal does not rotate to a signal exceeding the color region after an RGB signal is color-space-converted into a luminance signal and color-difference signals (Y/Cr/Cb) or further into sRGB (standard RGB). This method is well-worn means called a "3D look-up table process", and the circuit size becomes considerably large.

The color hue rotation avoidance methods of the related art have the following problems that blown out to white occurs due to insufficient gradation in a high-luminance portion and color rotation as a result of an RGB signal clip occurring due to γ correction before the RGB signal is color-space-converted into a luminance signal and color-difference signals (Y/Cr/Cb) cannot be suppressed.

The problem of color hue rotation occurs because the amount of saturation electric charge of pixels is insufficient and the dynamic range is insufficient. The resolving power of digital cameras is nearing that of silver-halide photographs due to a marked increase in the number of pixels in digital cameras, but images obtained using digital cameras are inferior to silver-halide photographs in terms of color reproducibility.

Most digital cameras are provided with a function of selecting a sensitivity condition corresponding to the ISO sensitivity in silver-halide cameras. That is, a sensitivity improvement technology of gain increase is used to capture an image of a low-illumination subject for which a sufficient sensitivity cannot still be obtained by exposure correction. Gain increase enables sensitivity to be increased by amplifying an output signal of a CCD or the like and by relatively increasing the luminance range, making it possible to capture an image of a dark place and a low-illumination subject. ISO 100 is set as a standard sensitivity, and ISO 200, ISO 400, and so on are provided as high sensitivity modes.

A signal processing range is often not appropriately set with respect to sensor output for each setting of the ISO sensitivity of a digital camera, and the output signal range of a fixed image-capturing device, which can be used originally, is not effectively utilized, which is problematical. In the following, this point will be considered.

When the upper limit of a used signal amplitude at ISO 100, that is, at the time of normal image capturing in which a standard gain is used, is denoted as s and the gain at this time is denoted as a, the upper limit of the used signal amplitude at ISO 200, that is, at the time of gain increase, is s/2, and the gain is 2a. In the gain-increased high sensitivity mode, since the amount of exposure is set to be lower than standard exposure, the margin until the amount of saturation electric charge is reached becomes large. Therefore, by expanding the image-capturing range on the high-luminance side of a subject whose image can be captured, signal components of the subject on the high-luminance side, which cannot be obtained in the usual image-capturing mode, will fit into the output signal of that CCD or the like with certainty.

The current situation is that there is no margin from the average amount of exposure of a subject to the saturation level of a CCD. Therefore, in general, the saturation level of a CCD is set as the standard gain, that is, the upper limit of used signal amplitude at ISO 100. For example, if AD conversion is performed at 10 bits on CCD sensor output of the amount of saturated signal (maximum output) 500 mV, at ISO 100, all 500 mV is used as 1023 gradations (refer to FIG. 17). In the case of JPEG (Joint Picture Experts Group), an RGB image signal of 1023 gradations is reassigned to 255 gradations by γ correction. On the other hand, at ISO 200, sensor output 250 mV, which is half of 500 mV, is set as 1023 gradations (refer to FIG. 18), and a signal is clipped at 1023 gradations at the time of gain amplifier output. Therefore, it follows that only half of the CCD maximum output, that is, the amount of saturation electric charge, is used.

However, since the region from 250 mV up to 500 mV is effective as CCD sensor output, it should be utilized as an image-capturing range on the high-luminance side. However, when gradation conversion is performed even in the high sensitivity mode using a γ correction circuit in the same manner as in the standard mode, the image-capturing range of the subject on the high-luminance side, for which the gradation can be converted, by using the image-capturing range limit (in the example shown in FIG. 17, 1023 gradations) in the standard mode as a reference, is limited, and the expansion effect of the image-capturing range on the high-luminance side, which is expanded in the high sensitivity mode, cannot be reflected in the image.

In contrast, there has been proposed an image-capturing apparatus that performs gain increase and changing of gradation conversion characteristics in combination, that is, performs conversion of gradation conversion characteristics such that the effective maximum input value of gradation conversion characteristics is set to be high at the time of a high gain, thereby reflecting the expansion effect of the image-capturing range of an image-capturing device on the high-luminance side, which occurs due to gain increase, in the image, and can thus expand the reproduction region of the subject on the high-luminance side (refer to, for example, Patent Document 3).

According to the image-capturing apparatus, at ISO 200, all 500 mV is used as 2047 gradations, and an RGB image signal of 2048 bits can be reassigned to 255 gradations in accordance with "γ characteristics at the time of a wide D range" by γ correction. The "γ characteristics at wide D range time" are set in such a manner that they are the same characteristics as the standard γ characteristics in the region on the low-luminance side up to 75% of the amount of saturation electric charge and the degree of compression of gradation is high in the region on the high-luminance side higher than 75% of the amount of saturation electric charge.

However, in the method according to Patent Document 3 or the like, it is undeniable that reproducibility in the high-luminance region in which the degree of compression of gradation is increased is sacrificed. If, in particular, gradation conversion is performed on an RGB signal so as to fit into the specified gradation by γ correction before the RGB signal is color-space-converted into a luminance signal and color-difference signals (Y/Cr/Cb), it is not possible to sufficiently suppress color rotation and color overexposure as a result of the occurrence of an RGB signal clip. In Patent Document 3, a method of improving the dynamic range has been disclosed, but no mention has been made in the problem of color hue rotation in the vicinity of a saturation level of color-difference signals.

[Patent Document 1] Japanese Unexamined Patent Application Publication No. 2003-179809
[Patent Document 2] Japanese Unexamined Patent Application Publication No. 2004-23605
[Patent Document 3] Japanese Unexamined Patent Application Publication No. 2002-33956 (FIG. 2, paragraph 0036)

DISCLOSURE OF INVENTION

Problems to be Solved by the Invention

An object of the present invention is to provide a superior image signal processing apparatus and a superior image signal processing method capable of outputting a luminance signal and color-difference signals (Y/Cr/Cb, etc.) having a dynamic range on the basis of an image signal obtained from a solid-state image-capturing device.

Another object of the present invention is to provide a superior image signal processing apparatus and a superior image signal processing method capable of widening a dynamic range by setting an appropriate signal processing range for each sensitivity setting of a digital camera and by effectively using the output range that is originally possessed by a solid-state image-capturing device and capable of obtaining an image having less color hue rotation.

Means for Solving the Problems

The present invention has been made in view of the above-described problems. The present invention provides an image signal processing apparatus for outputting a luminance signal and color-difference signals of a predetermined output bit length on the basis of a captured image of a subject, the image signal processing apparatus including:

image signal input means for inputting an image signal such that an image of a subject is captured;

amplifying means for expanding the dynamic range of the input image signal;

means for computing an RGB signal on the basis of an image signal in which the dynamic range is expanded;

RGB γ correction means for performing RGB γ correction on the RGB signal and outputting the signal such that bits are expanded more than the output bit length;

conversion means for computing a luminance signal and color-difference signals on the basis of the RGB signal such that bits are expanded by the RGB γ correction means; and non-linear correction means for performing non-linear correction so that the computed output level of the luminance signal is fit into the output bit length.

The present invention relates to an image signal processing apparatus for outputting a luminance signal and color-difference signals (Y/Cr/Cb, etc.) having an appropriate dynamic range on the basis of an image signal obtained from a solid-state image-capturing device in an image-capturing apparatus for capturing a digital image by using a solid-state image-capturing device, such as a CCD.

This type of image-capturing apparatus called a digital camera is able to perform image processing and image management through a computer, and has the convenience of not having the film lifetime problem. In recent years, the number of pixels in a solid-state image-capturing device has markedly increased with the advancement of a microfabrication technology, and image resolution is now nearing that of a silver-halide photograph. However, due to the limitation regarding the amount of saturation electric charge, there are serious problems concerning an insufficient dynamic range and color hue rotation in a high-luminance region, and images obtained using the solid-state image-capturing device are inferior to silver-halide photographs in terms of color reproducibility.

In comparison, the image signal processing apparatus according to the present invention is configured as follows. Attention is directed to the point that, when a digital camera is set to have an ISO sensitivity higher than a minimum ISO sensitivity, the amount of exposure is set to be lower than standard exposure, and therefore, the margin until the amount of saturation electric charge is reached becomes large. Even when the ISO sensitivity setting is switched to a high sensitivity in order to achieve gain increase, an RGB signal having a wide dynamic range containing the output range of a solid-state image-capturing device on the high-luminance side, which occurs due to gain increase, is input without changing the upper limit of used signal amplitude, and the region up to the amount of saturation electric charge is effectively used.

More specifically, at ISO 100 (minimum sensitivity), when the amount of saturation electric charge 500 mV of a CCD sensor is assigned to 10 bits (1023 gradations), which is the resolution of AD conversion output, even in the case that the sensitivity mode is set to ISO 200 and gain is increased, the amount of saturation electric charge 500 mV is made to be 10 bits (1023 gradations) without change, which is the resolution of AD conversion output, and a signal such that sensor output exceeds 250 mV is expanded to an RGB γ correction level (bit length) and thereafter is sent to processing at a subsequent stage.

According to the image signal processing apparatus of the present invention, after an output level (bit length) of an RGB γ correction process is expanded, a luminance signal and color-difference signals are sent. By expanding the bit length of RGB γ correction output, it is possible to perform RGB γ correction having characteristics close to an ideal γ curve. More specifically, as a result of having 9 bits of RGB γ correction output, the color-difference signals with characteristics close to $\gamma^{1/2.2}$ and sRGB γ are generated.

In this case, clipping is applied to the color-difference signals in the course of performing color-difference conversion on bit-expanded RGB γ output. As a result of generating an 8-bit color-difference signal from 9-bit RGB γ correction output using a power γ ($\gamma^{1/2.2}$), color-difference matrix clip becomes difficult to apply due to the high-order bit expansion riding on the power γ. Therefore, it is possible to markedly reduce color-difference clipping and color hue rotation in a high-luminance region.

Regarding a luminance signal, it is possible to ensure a luminance signal having a wide dynamic range by non-linear correction means by performing a non-linear process evaluated as Δγ correction for RGB γ correction at a previous stage so that the luminance signal is fit into the length of 8 bits to be output, that is, 255 gradations.

The RGB γ correction means outputs RGB γ correction at the same bit length as that in the related art when a low sensitivity is set and does not use high-order bits expanded from a gain amplifier, and therefore uses an RGB γ curve for low sensitivity for performing output in accordance with the output bit length. On the other hand, when a high sensitivity is set, the contrast is matched with that of a captured image when a low sensitivity is set in accordance with the RGB γ curve for low sensitivity from a low luminance to a medium luminance. Furthermore, in the high-luminance region, by using an RGB γ curve for high sensitivity having a curve in accordance with a power γ, a signal in which bits are expanded more than the output bit length is output, thereby making it possible to implement large suppression of color rotation and expansion of a dynamic range in the high-luminance region.

The Δγ correction means forms, for example, an RGB γ curve to be a straight-line form in which Δγ correction input is directly used as Δγ correction output in the region formed by an image-plane formation γ curve from a low luminance to a medium luminance. On the other hand, the Δγ correction means can perform gradation conversion of a luminance signal by using a Δγ curve formed from a curve with which compression is performed so as to fit into 255 gradations in a high-luminance region subsequent to a place, which is a reference, where an image-plane formation γ curve changes to a $γ^{1/2.2}$ curve, making it possible to ensure the dynamic range while the gradation of the high-luminance portion is maintained.

In this case, although the contrast can be matched with that when a low sensitivity is set in the region from a low luminance to a medium luminance, since gradation compression is performed only for a high-luminance region, gradation becomes insufficient in this region, and the luminance reproducibility deteriorates. For example, in a captured image containing many high-luminance portions, it is a problem that the influence of the high-luminance portions appears.

Therefore, the Δγ correction means may compress a dynamic range of a luminance signal and also may improve the luminance signal resolution by drawing a Δγ curve (non-linear correction curve) as desired. More specifically, the image signal processing apparatus further includes histogram detection means for histogram-detecting a luminance signal and for determining a luminance region where the histogram is concentrated, and Δγ curve generation means for adaptably generating a Δγ curve so as to moderate the degree of compression of gradation in a luminance region where the histogram is concentrated. The Δγ correction means performs gradation conversion of a luminance signal in accordance with the Δγ curve supplied from the Δγ curve generation means. In this case, in an image having a histogram concentrated in the high-luminance portion, by making correction to a Δγ curve having gradation characteristics on the high-luminance side, the gradation characteristics in the high luminance can be improved.

On the other hand, when gradation conversion for high sensitivity is to be performed, a Δγ table used for Δγ correction needs to be provided in addition to a usual RGB γ table, causing the circuit size to be increased. Therefore, with regard to an RGB γ curve, the Δγ correction means may perform gradation conversion of a luminance signal by using a Δγ curve that is formed to be a straight-line form in which Δγ correction input is directly used as Δγ correction output in a region formed by an image-plane formation γ curve from a low luminance to a medium luminance and that is straight-line-approximated so as to fit into 255 gradations in a high-luminance region subsequent to a place, which is a reference, where the image-plane formation γ curve changes to the $γ^{1/2.2}$ curve. In this case, since gradation conversion of a luminance signal can be performed by simple function calculations without referring to the Δγ table, the circuit size can be reduced.

When a wide dynamic range signal is gradation-converted to 8 bits of an output format as in the present invention, there is a problem in that the gradation feeling on the high-luminance side is insufficient. With respect to the above, for example, the gradation characteristics of the high luminance can be compensated for by performing aperture compensation.

More specifically, the image signal processing apparatus according to the present invention further includes a high-pass filter for obtaining a high-frequency signal from one or both of a luminance signal computed on the basis of a G signal before RGB γ correction by the RGB γ correction means and an RGB signal before γ correction, and a luminance signal computed from a γ conversion output signal; and luminance signal level detection means for inputting a luminance signal Y after or before non-linear correction is performed, detecting a portion exceeding a change point at which the non-linear correction curve changes from a straight line to a curve with which gradation conversion is performed, setting the gain value to 0 in a portion lower than or equal to the change point, and outputting a gain value of 0 to 1 corresponding to the luminance signal level in a portion higher than the change point. A high-frequency compensation signal is generated by multiplying the output of the high-pass filter with a gain value from the level detector means, and this signal is added to a luminance signal after Δγ correction or before Δγ correction. As a result, an edge portion in the high-luminance region can be superposed on the luminance signal, thereby compensating for the gradation characteristics at a high luminance.

As a result of installing a digital camera in the image signal processing apparatus according to the present invention, the dynamic range can be widened by setting an appropriate output signal level of a solid-state image-capturing device for each sensitivity setting and by effectively using the output range that is originally possessed by the solid-state image-capturing device, and color hue rotation in the vicinity of the amount of saturation electric charge can be reduced.

However, in gradation conversion for high sensitivity such that Δγ correction is further applied to a luminance signal by bit-expanding RGB γ correction output, the system control load is higher than that of a usual gradation conversion. Accordingly, when the image signal processing apparatus is to be installed in an image-capturing apparatus, the image signal processing apparatus may further include selection output means for outputting a luminance that is gradation-converted by the non-linear correction means so as to be fit into the output bit length by the Δγ correction means in a still-image-capturing mode and for directly outputting a luminance signal that is generated by the color conversion means in the monitoring mode.

In such a case, when the digital camera is in a monitoring mode, Δγ correction is not used, the luminance signal to be output is clipped at 255 gradations, and the information in the high-luminance portion is lost. However, since it is not that an image is stored, no particular problem is posed even if the reduction in the system control load takes a higher priority.

Advantages

According to the present invention, it is possible to provide a superior image signal processing apparatus and a superior image signal processing method capable of converting an image signal obtained from a solid-state image-capturing device into an image signal composed of a luminance signal and color-difference signals (Y/Cr/Cb, etc.) having an appropriate dynamic range.

According to the present invention, it is possible to provide a superior image signal processing apparatus and a superior image signal processing method capable of widening the dynamic range by setting an appropriate output signal level of a solid-state image-capturing device for each sensitivity setting and by effectively using the output range that is originally possessed by the solid-state image-capturing device, and also capable of reducing color hue rotation in the vicinity of the amount of saturation electric charge.

According to the present invention, since a luminance signal and color-difference signals are generated after the output level (bit length) in an RGB γ correction process are expanded, with regard to the color-difference signals, the dynamic range is improved and color rotation is reduced due to the fact that clip caused by RGB γ correction of the related art is lost. Regarding color rotation and the color dynamic range, clipping is applied to color-difference signals in the course of performing color difference conversion on bit-expanded RGB γ output. Having a sufficient RGB γ output level enables large suppression of color rotation and expansion of the dynamic range to be implemented. The luminance signal is subjected to a non-linear process exclusively used for luminance so as to fit into 255 gradations, making it possible to obtain a luminance signal having a wide dynamic range.

The system control load of gradation conversion for high sensitivity of a luminance signal is higher than that of usual gradation conversion. Therefore, in the image-capturing apparatus according to the present invention incorporating an image signal process, gradation conversion for high sensitivity is applied only when a still image is to be captured and is not applied in the monitoring mode in which only finder output is performed, thereby making it possible to reduce the system control load.

Further other objects, features, and advantages of the present invention will become apparent from the more detailed description based on the embodiments of the present invention as will be described later and the attached drawings.

BRIEF DESCRIPTION OF THE DRAWINGS

FIG. 4 shows the function configuration with which the image signal processing apparatus according to the present invention performs operation when set to ISO 200, ISO 400, or the like.

Figure 1:
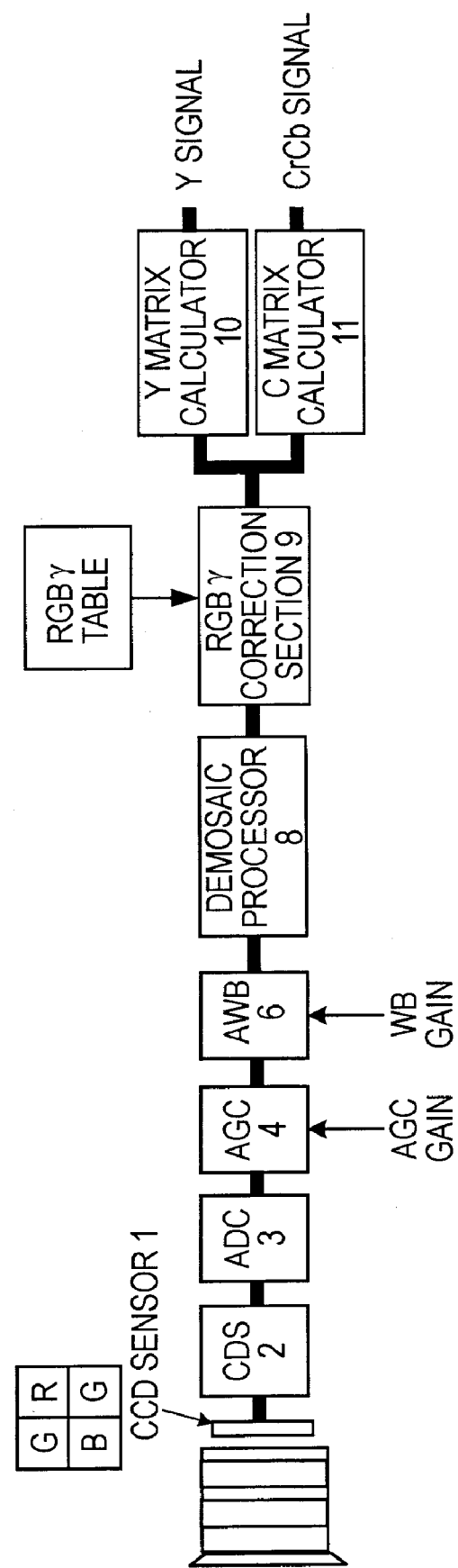
FIG. 1 shows the configuration of an image signal processing apparatus according to an embodiment of the present invention.

| | Reference Numerals |
|---|---|
| 1 | CCD sensor |
| 2 | CDS (Correlated Double Sampling) circuit |
| 3 | AD converter |
| 4 | AGC (Automatic Gain Control) |
| 5 | AWB (Auto White Balance) |
| 8 | demosaic processor |
| 9 | RGB γ correction section |
| 10 | Y matrix calculator |
| 11 | C matrix calculator |
| 12 | Δγ correction section |

-continued

| | Reference Numerals |
|---|---|
| 13 | histogram detector |
| 14 | Δγ table generator |
| 15 | high-pass filter |
| 16 | level detector |

BEST MODE FOR CARRYING OUT THE INVENTION

An embodiment of the present invention will be described below in detail with reference to the drawings.

FIG. 1 shows the configuration of an image signal processing apparatus according to an embodiment of the present invention. The apparatus outputs a luminance signal and color-difference signals (Y/Cr/Cb, etc.) on the basis of an RGB image signal obtained by performing signal processing on an image obtained from a solid-state image-capturing device or the like. In the example shown in FIG. 1, function configuration for performing operation when set to ISO 100, that is, to minimum ISO sensitivity, is shown.

For a sensor 1, a solid-state image-capturing device, such as a CCD, is used. Pixels having a photoelectric conversion effect are arranged in two dimensions and, for example, a G checkered RB color coding single plate is arranged on the light-receiving side. Signal electric charge corresponding to the amount of incident light passed through each color filter is stored in each pixel, and the color of the incident light at the pixel position can be reproduced on the basis of each of the amount of signal electric charge of three colors, which is read from each pixel.

For the pixel signal from the sensor 1, low noise of the signal received from the CCD sensor 1 is suppressed with high precision by a CDS (Correlated Double Sampling) circuit 2 and thereafter is converted into a digital signal by an AD converter 3. Furthermore, after appropriate gain control is applied by an AGC (Automatic Gain Control) circuit 4, white balance gain is applied by an AWB (Auto White Balance) 5, thereby reproducing an appropriate color, and an RGB screen signal is generated by a demosaic processor 8.

In the RGB γ correction section 9, gradation conversion is performed on an RGB signal to correctly reproduce gradation when a captured image is to be output. When AD conversion has been performed at 10 bits on the output of the CCD sensor 1, the RGB image signal of 10 bits (that is, 1023 gradations) is reassigned to 8 bits (that is, 255 gradations) by γ correction.

Thereafter, in each of a Y matrix calculator 10 and a C matrix calculator 11, the RGB image signal is color-space-converted into a luminance signal and color-difference signals (Y/Cr/Cb), and is subjected to JPEG compression by an encoder (not shown), and the data is stored on a recording medium (not shown).

Figure 2:
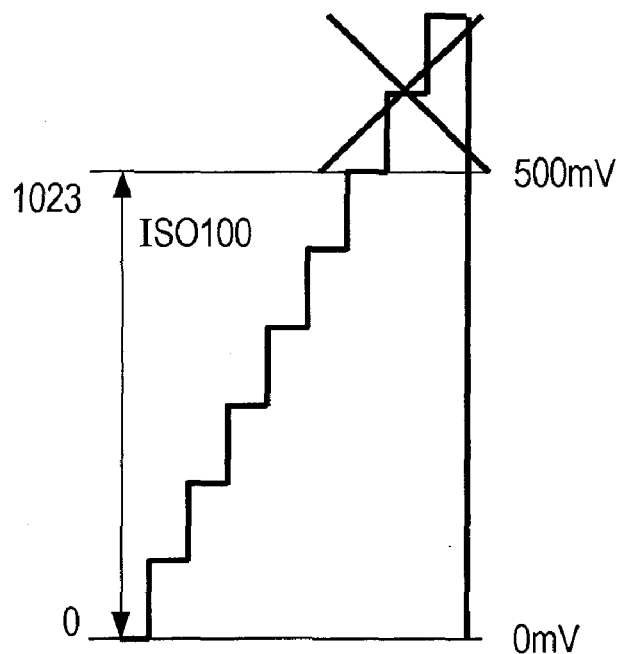
FIG. 2 shows a state in which an RGB image signal of 1023 gradations is assigned to 255 gradations by γ correction so as to conform to JPEG that is an output format.
Figure 17:
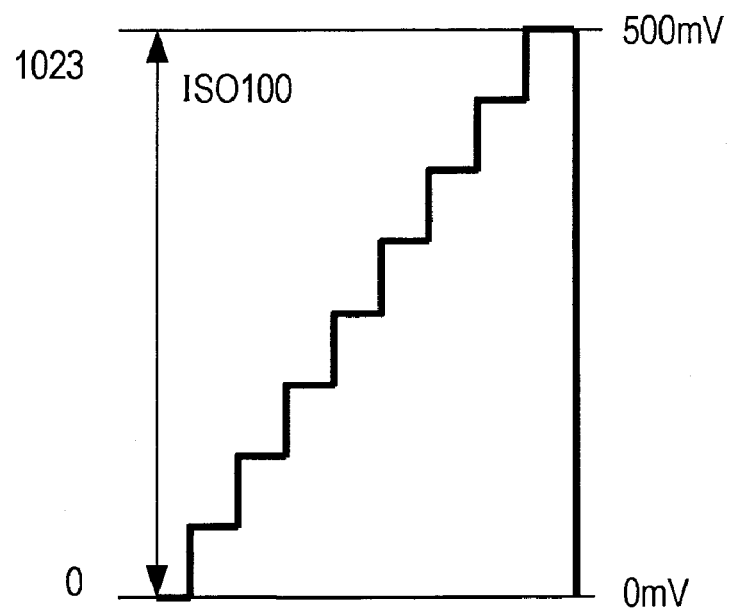
FIG. 17 shows a state in which, when AD conversion at 10 bits is performed on CCD sensor output of the amount of saturation signal (maximum output) 500 mV, all 500 mV as 1023 gradations is used up to the upper limit of signal amplitude at ISO 100.

The current situation is that there is no margin from the average amount of exposure of a subject to the saturation level of a CCD. Therefore, at the minimum ISO sensitivity, the saturation level of the CCD is set as the standard gain, that is, as the upper limit of used signal amplitude at ISO 100. For example, at ISO 100, all 500 mV is used as 1023 gradations (refer to FIG. 17). Then, the RGB image signal of 1023 gradations is reassigned to 255 gradations by γ correction so as to conform to JPEG that is an output format. In this case, for the CCD sensor of the amount of saturation electric charge 500 mV, at ISO 100, data exceeding 1023 gradations, which is set to the amount of saturation electric charge cannot be used (refer to FIG. 2).

Figure 18:
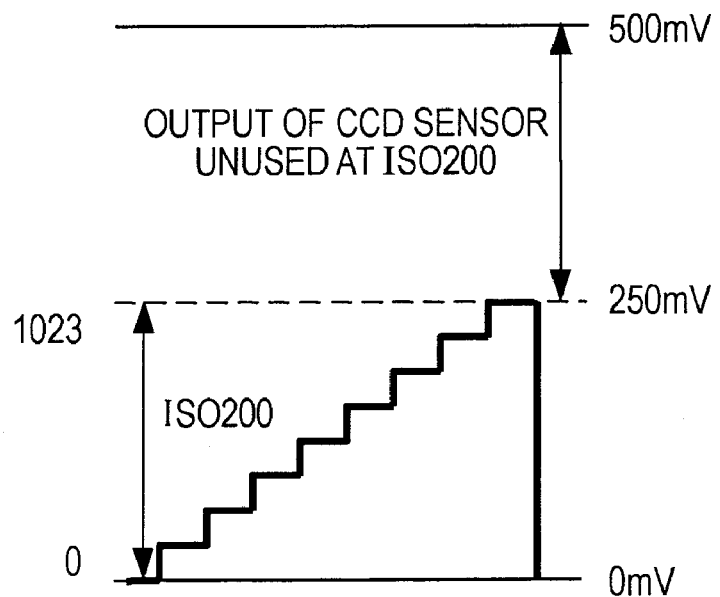
FIG. 18 shows a state in which, at ISO 200, half of the amount of saturation electric charge is set to the upper limit of signal amplitude, and an input signal is used by setting the sensor output 250 mV as 1023 gradations.

On the other hand, at an ISO sensitivity setting higher than the minimum ISO sensitivity, the amount of signal used in the output of the CCD is reduced in an amount corresponding to the gain increase, thereby implementing a high sensitivity, and the image of a low-illumination subject for which sufficient sensitivity cannot be obtained by exposure correction can be captured. Since the amount of exposure is set lower than the standard exposure, the margin until the amount of saturation electric charge is reached becomes large. In contrast, in the related art, since the upper limit of used signal amplitude is decreased in an amount corresponding to the gain increase, the region from the upper limit up to the amount of saturation electric charge is an unused region. For example, at ISO, 200 sensor output 250 mV half of 500 mV is represented by 1023 gradations (refer to FIG. 18), and only half of the CCD maximum output, that is, the amount of saturation electric charge, is used. At ISO 200, in spite of the fact that a signal exceeding the upper limit 250 mV of used signal amplitude is effective as CCD sensor output, the common practice is that the signal is clipped at 1023 gradations and gradation higher than this is not used.

Figure 3:
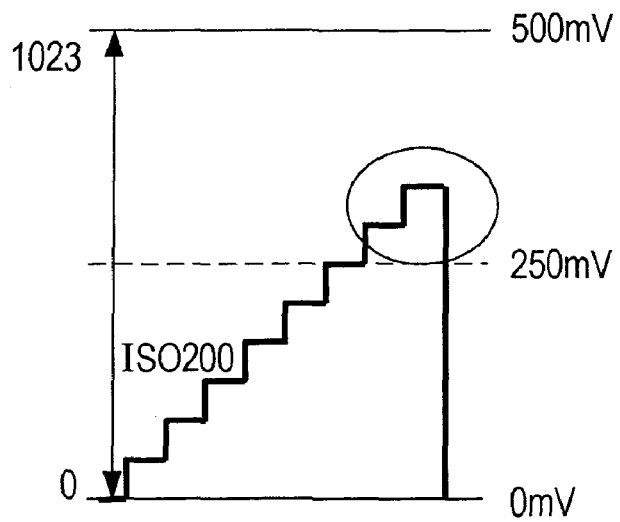
FIG. 3 shows a state in which, when set to ISO 200 and gain is increased, the amount of saturation electric charge 500 mV is made to be 10 bits (1023 gradations) without change, which is the resolution of AD conversion output, and a signal exceeding 250 mV is used.

In comparison, in this embodiment, even when gain is increased by changing ISO sensitivity setting, the dynamic range is widened by effectively using the region until the amount of saturation electric charge is reached without changing the upper limit of used signal amplitude. More specifically, as shown in FIG. 3, even when set to ISO 200 and gain is increased, the amount of saturation electric charge 500 mV is made to be 10 bits (1023 gradations) without change, which are the resolution of AD conversion output, the RGB γ correction level (bit length) of a signal exceeding 250 mV is expanded and sent, and a non-linear process and subsequent processing are appropriately set. Therefore, the dynamic range can be improved, color rotation can be reduced, and a more satisfactory image can be obtained.

Figure 4:
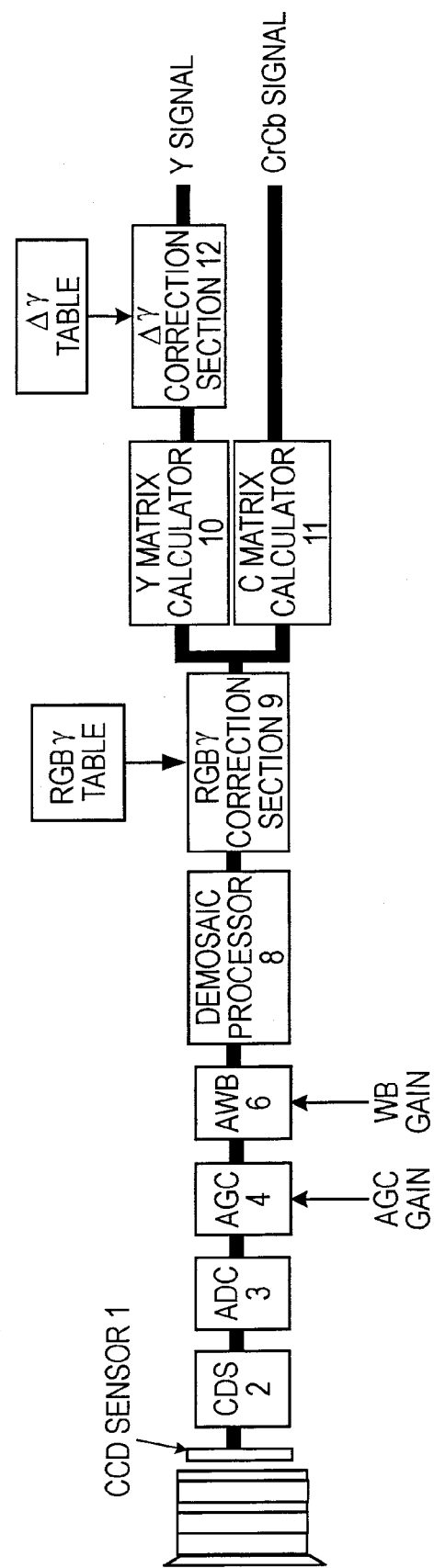

FIG. 4 shows the function configuration with which the image signal processing apparatus according to the present invention performs operation when set to ISO 200. In a G checkered RB color coding single plate camera, the part for AD-converting the output signal of the CCD sensor 1 after a CDS process is performed and obtaining a digital signal is identical to the configuration shown in FIG. 1.

Figure 5:
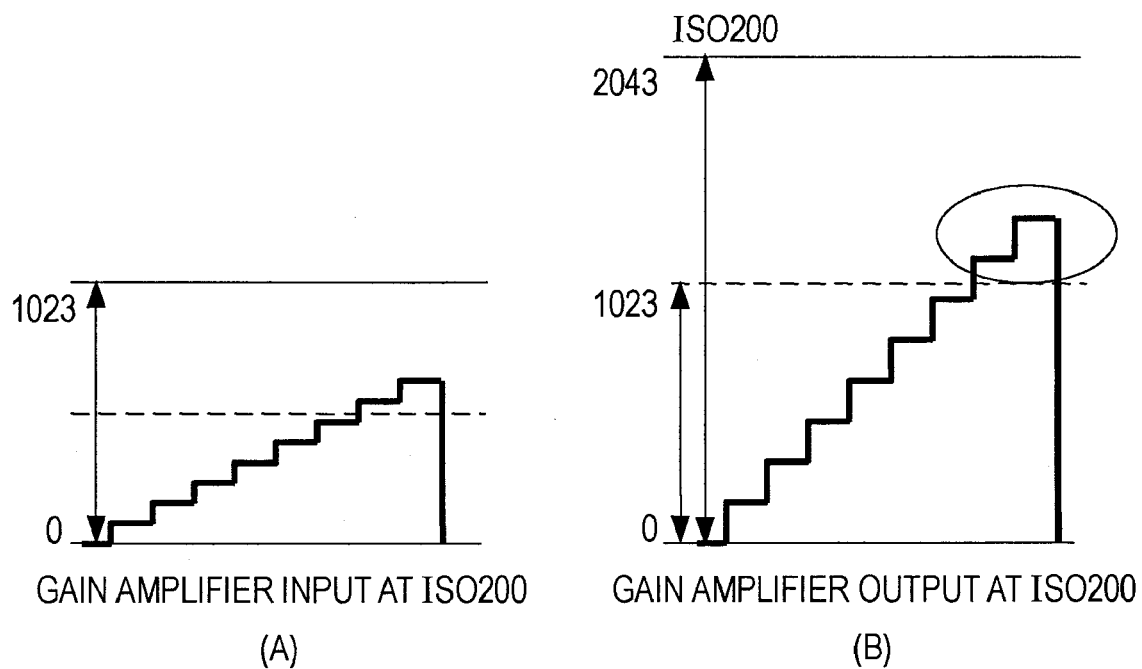
FIG. 5 shows an example of input/output of a gain amplifier of an AGC 4.

FIG. 5 shows an example of input/output of a gain amplifier of an AGC 4. In the setting of ISO 100, the input of 1023 gradations from the AD converter 3 is multiplied by ×1 (that is, made through) and is output at 1023 gradations. On the other hand, when set to ISO 200, 6 dB corresponding to an amount of increase at ISO sensitivity is applied to the input (refer to FIG. 5(A)) of 1023 gradations. Thereafter, it is output at a wide range of 2047 gradations for +6 dB (refer to FIG. 5(B)) without clipping at 1023 gradations unlike in the related art, and a signal having a wide input is transmitted until RGB γ correction at a later stage.

According to the configuration shown in FIG. 4, after the output level (bit length) in an RGB γ correction process is expanded, a luminance signal and color-difference signals can be generated. In this case, for the color-difference signals, since clipping by RGB γ correction of the related art does not occur, the dynamic range is improved and color rotation is reduced. Regarding a luminance signal, by performing a non-linear process (also referred to as "Δγ correction" in this specification) so as to fit into 255 gradations, which is an output format, it is possible to obtain a luminance signal having a wide dynamic range. The details of Δγ correction will be described later.

Main differences of signal processing when ISO 200 is set when compared with that when ISO 100 is set are as follows.

(1) The signal level subsequent to a gain control amplifier is expanded, and a signal having a wide dynamic range is transferred to a subsequent stage of the signal processing.
(2) Characteristics of an RGB γ curve differ, and the bit length of a γ correction output signal is longer.
(3) Δγ correction is performed on a luminance signal, and the bit length of signal processing differs.

For the color rotation and the color dynamic range, clipping is applied to color-difference signals in the course of performing color-difference conversion on bit-expanded RGB γ output, and as a result of having a sufficient RGB γ output level, it is possible to implement a large suppression of color rotation and an expansion of the dynamic range.

In FIG. 5, an example is shown in which, with respect to the dynamic range setting of 150% at minimum ISO sensitivity 100, the dynamic range is expanded to 2047 gradations of 300% at ISO 200 as a high sensitivity mode. However, theoretically, the dynamic range can be improved in a high sensitivity like 4095 gradations of 600% at ISO 400, and hereafter like 8191 gradations at ISO 800, and 16383 gradations at ISO 1600. The dynamic range 100% referred to herein refers to a case in which there is output 255 with respect to input 683.

In the case of ISO 200, the RGB γ correction section 9 performs gradation conversion of RGB image signal input of 11 bits (=2047) from the gain amplifier 4. The output of a normal RGB γ correction curve is 8 bits. Based on this output, a luminance signal and color-difference signals are computed in accordance with the following equations.
[Equation 1]

$$Y=0.3R+0.59G+0.11B \quad (1)$$

$$R-Y=0.7R-0.59G-0.11B \quad (2)$$

$$B-Y=-0.3R-0.59G+0.89B \quad (3)$$

An ideal RGB γ curve is $\gamma^{1/2.2}$ (power γ) and sRGB γ. However, for the convenience of making the output level match an 8-bit length, a γ curve (hereinafter also referred to as an "image-plane formation γ") used for actually forming an image plane often deviates from the RGB γ curve. However, as a result of the characteristics of the actual image-plane formation γ curve deviating from the ideal γ curve, side effects, such as insufficient luminance gradation representation, blown out to white of color-difference signals, and color hue rotation occurs.

Figure 6:
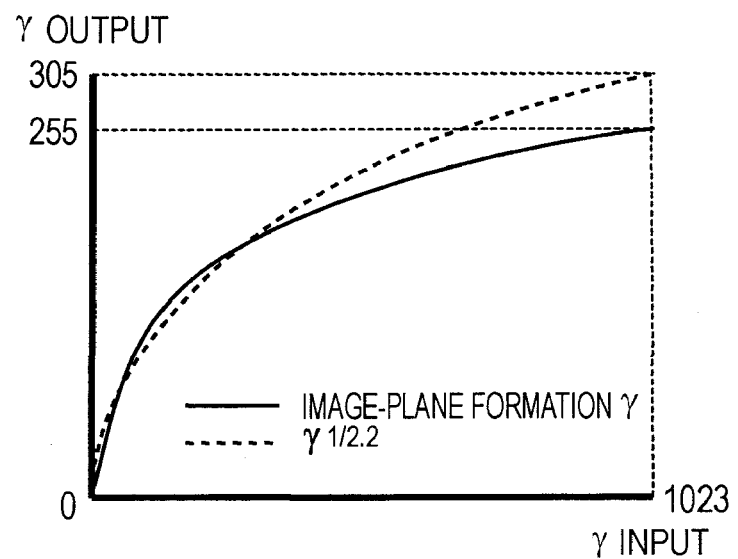
FIG. 6 shows a $\gamma^{1/2.2}$ curve and an image-plane formation γ curve.

FIG. 6 shows, as an example, a $\gamma^{1/2.2}$ curve, which is considered to be ideal in a television or the like, and an image-plane formation γ curve. The $\gamma^{1/2.2}$ curve is shown with a dotted line, and the image-plane formation γ curve is shown with a solid line. In the case of the setting shown in FIG. 6, if $\gamma^{1/2.2}$ is drawn with respect to signal input "1023" (that is, the dynamic range is set as 150%), the output is not fit into 255 gradations of 8 bits, and up to 305 gradations are used. In comparison, by considering a contrast feeling in a medium luminance region and gradations in a high-luminance region, an image-plane formation γ curve matching "255" output is designed. As a result, high luminance gradations can be somehow ensured in an amount corresponding to the input signal level. However, since the curve deviates from γ1/2.2, blown out to white of color-difference signals and color hue rotation are observed. In order to suppress these side effects, a system for erasing colors when viewed from the luminance signal level has been proposed. However, the problem occurs in that, since colors are lost, a problem occurs in that the image appears to be blown out to white. In general, when a γ curve deviates from the power, color hue rotation occurs.

Accordingly, in this embodiment, factors of color hue rotation before a color conversion process are removed by performing RGB γ correction such that the bits of RGB γ correction output are expanded more than the output bit length at the final stage (at the time of output of the image signal processing apparatus) so as to have characteristics close to an ideal γ curve. More specifically, for example, in the case of ISO 200, the RGB γ correction section 9 has an output of 9 bits, and thereby can generate color-difference signals with characteristics close to those of γ1/2.2 and sRGB γ. For the luminance signal Y, gradation compression is performed as appropriate by the Δγ correction section 12 at a subsequent stage, and an 8-bit output signal is obtained.

Next, a description will be given of a method of forming an RGB γ curve used by the RGB γ correction section 9.

Figure 7:
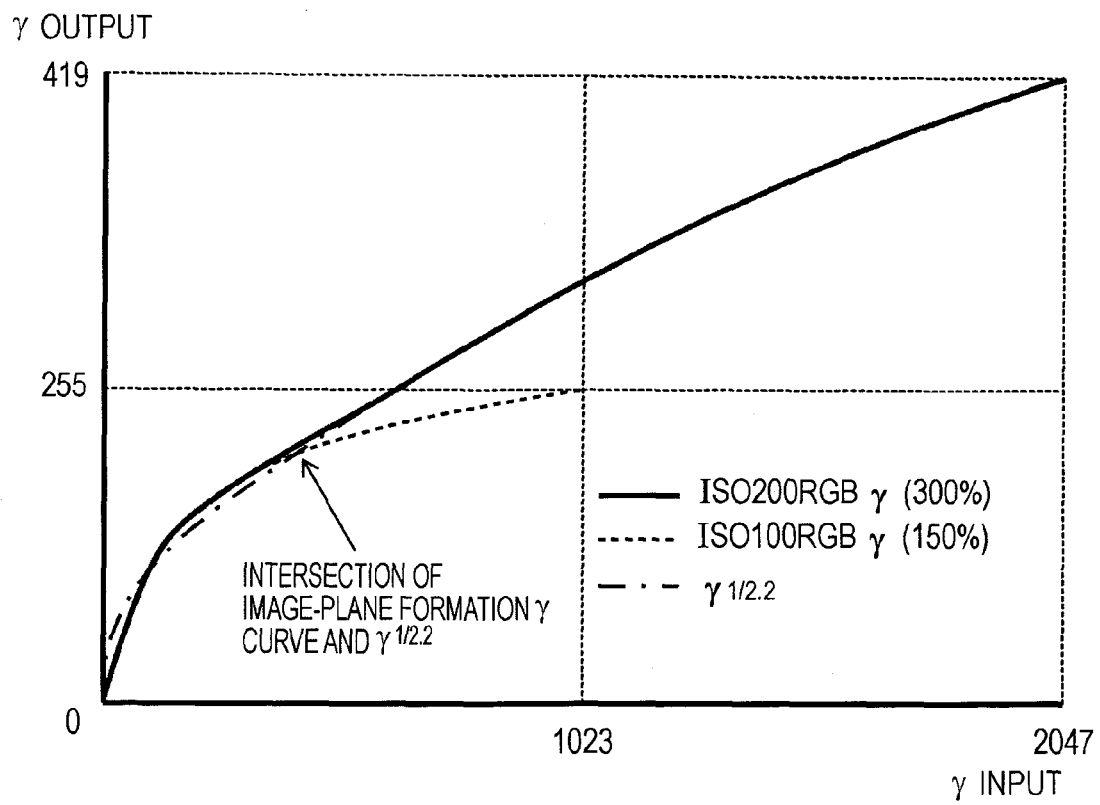
FIG. 7 shows an example of the structure of an RGB γ curve used to output 9 bits by using gain amplifier output of 10 bits as input.

FIG. 7 shows an example of the structure of an RGB γ curve for outputting 9 bits by using gain amplifier output of 11 bits as input. At minimum ISO sensitivity 100, a 150% dynamic range (1023 gradations) is set so that a 300% dynamic range (2047 gradations) is ensured at ISO 200.

When the sensitivity mode is set to ISO 100, there is signal input only up to 1023. Therefore, with respect to γ input of 1023 gradations, the RGB γ correction section 9 outputs γ at the same 255 gradations as in the related art (refer to a short dashed line in FIG. 7). In this case, since the high-order bits expanded from the gain amplifier 4 are not used (that is, clipped at 1023), Δγ correction for the luminance signal is unnecessary (refer to FIG. 1).

In comparison, when the sensitivity mode is set to ISO 200, as shown in FIG. 5, since bit expansion is performed due to gain increase by the AGC 3 at a previous stage, a signal having a dynamic range two times that at the time of ISO 100 (a 150% dynamic range is assumed), that is, having a 300% dynamic range, becomes γ input to the RGB γ correction section 9. The RGB γ correction section 9 applies gradation conversion to the input signal by using an RGB γ curve such that the output becomes 9 bits, which is expanded by 1 bit from 8 bits. As indicated by a solid line in FIG. 7, by using, for example, $\gamma^{1/2.2}$ as an RGB γ curve in a high-luminance region, color hue rotation is reduced, and the dynamic range is ensured. Contrasts are matched by using the same image-plane formation γ curve as that of ISO 100 from a low luminance to a medium luminance.

The bit-expanded RGB γ correction curve for ISO 200, shown in FIG. 7, changes from the image-plane formation γ curve to the $\gamma^{1/2.2}$ curve at a point where the input signal level is around 100%, that is, at a point where the image-plane formation γ curve and the $\gamma^{1/2.2}$ intersect each other. In the RGB γ correction in the high sensitivity mode, γ input having a dynamic range of 300% composed of 2047 gradations is converted into γ output of 419 gradations. An RGB γ table having characteristics shown in FIG. 7 is stored in, for example, a ROM (Read Only Memory).

The 9-bit output from the RGB γ correction section 9 is sent to the Y matrix calculator 10 and the C matrix calculator 11 at a subsequent stage, whereby a color conversion process is performed. As a result of the computation of equation (1) above, the luminance signal Y becomes 9-bit output. In the subsequent Δγ correction section 12, the 9-bit luminance signal is compressed to 8 bits of the output format. As a result, the RGB γ correction output is made full use of, and the luminance gradations can be ensured.

Figure 8:
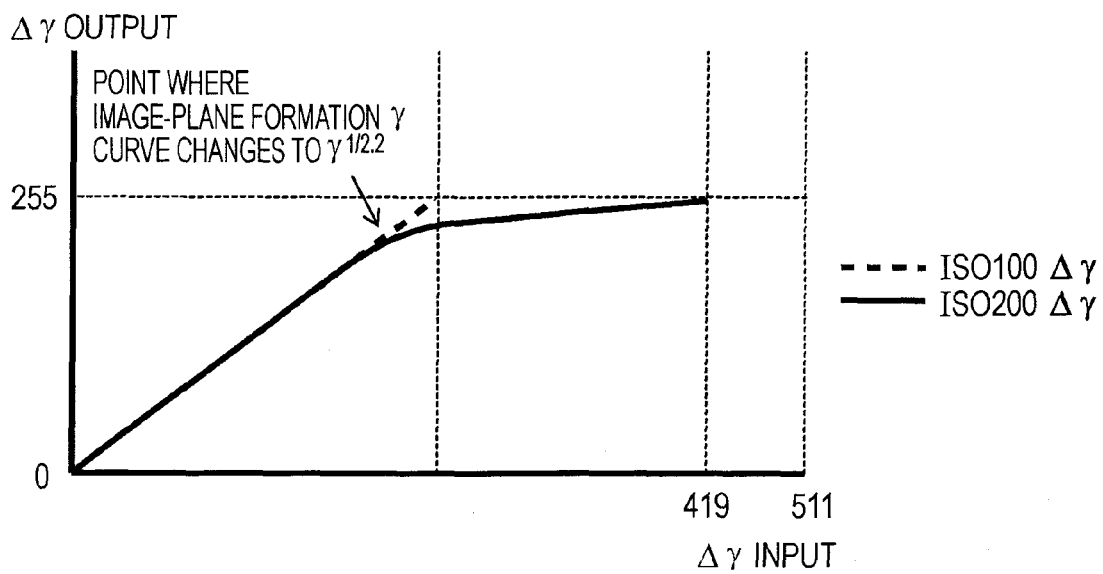
FIG. 8 shows an example of the structure of a Δγ correction curve used to adjust the output bit length of a luminance signal when ISO 200 is set.

FIG. 8 shows an example of the structure of a Δγ correction curve. At ISO 100, the dynamic range is not expanded in the manner described above. Therefore, as indicated by a broken line in FIG. 8, 8-bit Δγ correction input is directly used as Δγ correction output. That is, the Δγ correction curve in this case becomes a straight line.

On the other hand, at ISO 200, since RGB γ correction output is 419 gradations as shown in FIG. 7, it is necessary to apply Δγ correction thereto and to compress it to 8 bits of the output format. With regard to an RGB γ curve, the Δγ curve shown in FIG. 8 is formed to be a straight-line form in which Δγ correction input is output as is without change for a region formed by an image-plane formation γ curve from a low luminance to a medium luminance and formed to draw a curve with which compression is performed so as to fit into 255 gradations in a high-luminance region. This makes it possible to ensure the dynamic range while the gradation of the high-luminance portion is maintained. The high-luminance region referred to herein refers to a luminance region subsequent to a point, which is a reference, where the image-plane formation γ curve changes to the $γ^{1/2.2}$ curve (refer to FIG. 7) in the RGB γ curve. The Δγ table having characteristics shown in FIG. 8 is stored in, for example, a ROM.

At this point, as an example of advantages when the output of the RGB γ correction section 9 becomes 9 bits, which is expanded by 1 bit from 8 bits, signal processing for yellow (yellow is R:G:B=1:1:0) is used, and the calculation results of the actual gradation levels are listed in the table below. The RGB γ input 150 level is the same level output between an example of the related art (8 bits) and the embodiment (9 bits). However, as the input level becomes larger like 900, 1500, and 2000, in the example of the related art, the γ output sticks to (R−Y)=28 and (B−Y)=−227 in the example of the related art, and there are no changes in the color difference. In comparison, in this embodiment, although the input signal is 900 and (B−Y) sticks to 255, (R−Y) output does not stick and increases in a linear manner. As a result, color hue rotation can be suppressed.

TABLE 1

| RGBγINPUT | EXAMPLE OF RELATED ART | | EMBODIMENT | |
|---|---|---|---|---|
| | RGBγOUTPUT | (R−Y)/(B−Y) | RGBγOUTPUT | (R−Y)/(B−Y) |
| R: 150 | 124 | 13.64 | 124 | 13.64 |
| G: 150 | 124 | −110.36 | 124 | −110.36 |
| B: 0 | 0 | | 0 | |
| R: 845 | 248 | 27.28 | 280 | 30.8 |
| G: 845 | 248 | −220.72 | 280 | −249.2 |
| B: 0 | 0 | | 0 | |
| R: 900 | 250 | 27.5 | 289 | 31.79 |
| G: 900 | 250 | −222.5 | 289 | −257.21 |
| B: 0 | 0 | | 0 | |
| R: 1500 | 255 | 28.05 | 364 | 40.04 |
| G: 1500 | 255 | −226.95 | 364 | −323.96 |
| B: 0 | 0 | | 0 | |
| R: 2000 | 255 | 28.05 | 415 | 45.65 |
| G: 2000 | 255 | −226.95 | 415 | −369.35 |
| B: 0 | 0 | | 0 | |

When gradation conversion of a luminance signal is performed using a Δγ curve shown in FIG. 8, contrast can be matched with that when ISO 100 is set from the low luminance region to the medium luminance region. However, since gradation compression is performed only in the high-luminance region, the high luminance resolution becomes insufficient in this region. For example, in a captured image containing many high-luminance portions, it is a problem that influence of the high-luminance portions appears.

Accordingly, in the Δγ correction section 12, by drawing a Δγ curve as desired, the dynamic range of the luminance signal may be compressed and also the luminance signal resolution may be improved. For example, in an image in which high-luminance portions are concentrated, by correcting to a Δγ curve having gradation characteristics on the high-luminance side, gradation characteristics of a high luminance can be improved.

Figure 9:
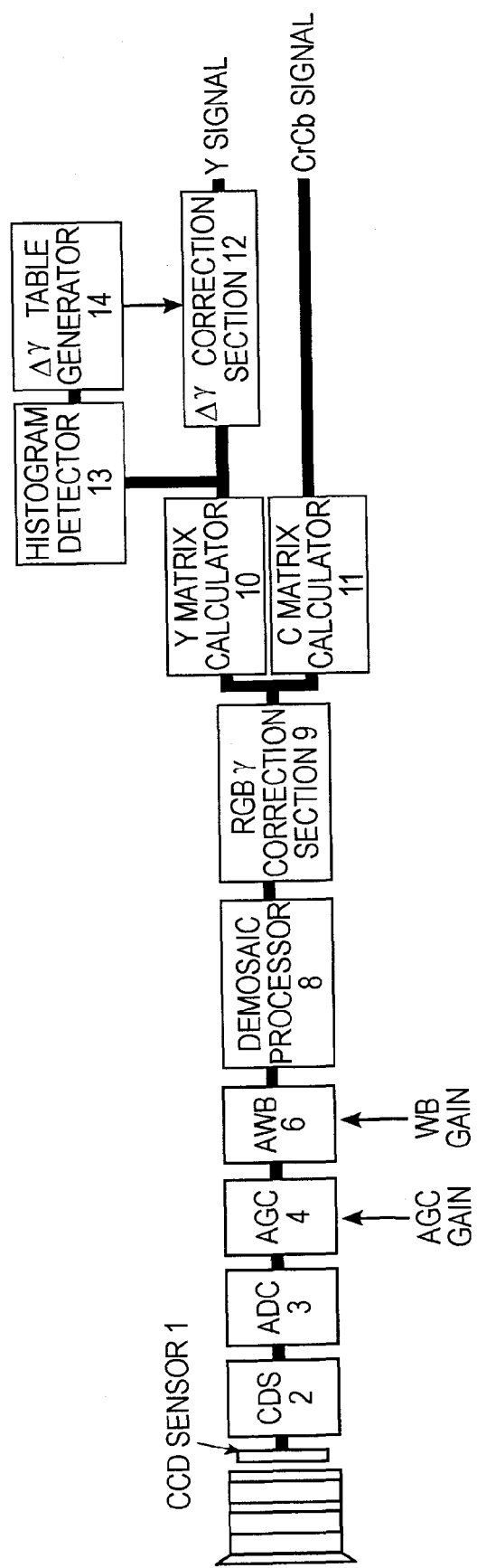
FIG. 9 shows an example of the configuration of an image signal processing apparatus configured to draw a Δγ curve as desired.

FIG. 9 shows an example of the configuration of an image signal processing apparatus configured to draw a Δγ curve as desired. A histogram detector 13 histogram-detects a luminance signal Y output from the Y matrix calculator 10 and determines a luminance region where the histogram is concentrated. A Δγ curve generator 14 adaptably generates a Δγ curve so as to moderate the degree of gradation compression in a luminance region where the histogram is concentrated, and supplies it as a Δγ table to the Δγ correction section 12.

Figure 10:
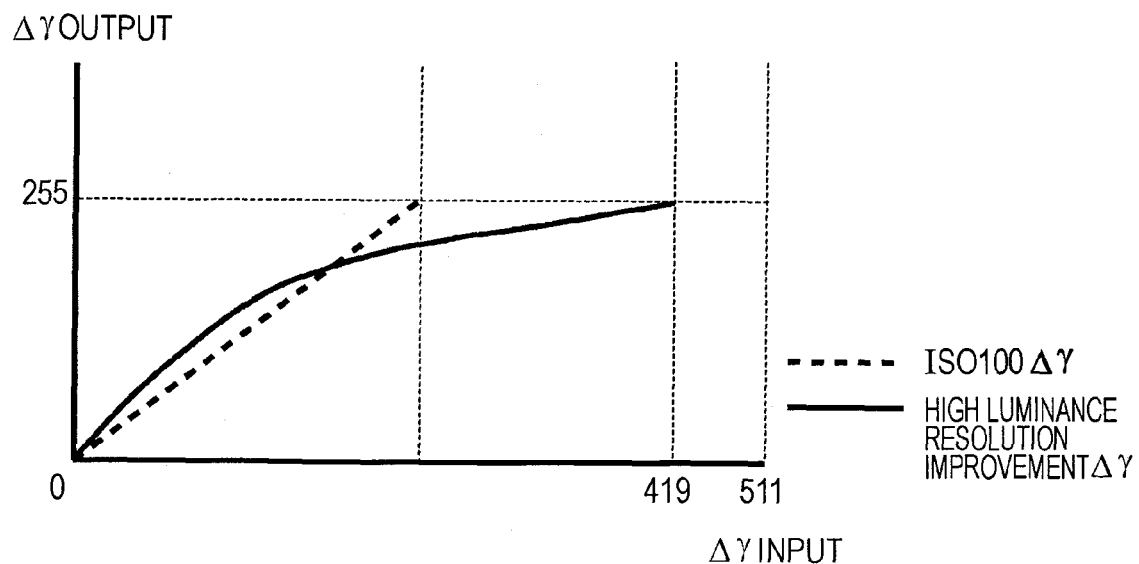
FIG. 10 shows an example of the structure of a Δγ curve in which gradation conversion is performed over the entire luminance region so that gradation is improved in a high-luminance region.

FIG. 10 shows, with a solid line, an example of the structure of a Δγ curve in which gradation conversion is performed over the entire luminance region so that gradation is improved in a high-luminance region, which is created by the histogram detector 13 and the Δγ table generator 14. When ISO 200 is set, RGB γ correction output having 419 gradations is accepted as Δγ input, and Δγ correction is applied to this so as to be compressed to 8 bits of the output format. Unlike the Δγ curve shown in FIG. 8, gradation compression is performed not only in a high-luminance portion but also in a low luminance to medium luminance region, and the medium luminance region and the high-luminance region are connected to each other via a smooth curve.

Figure 11:
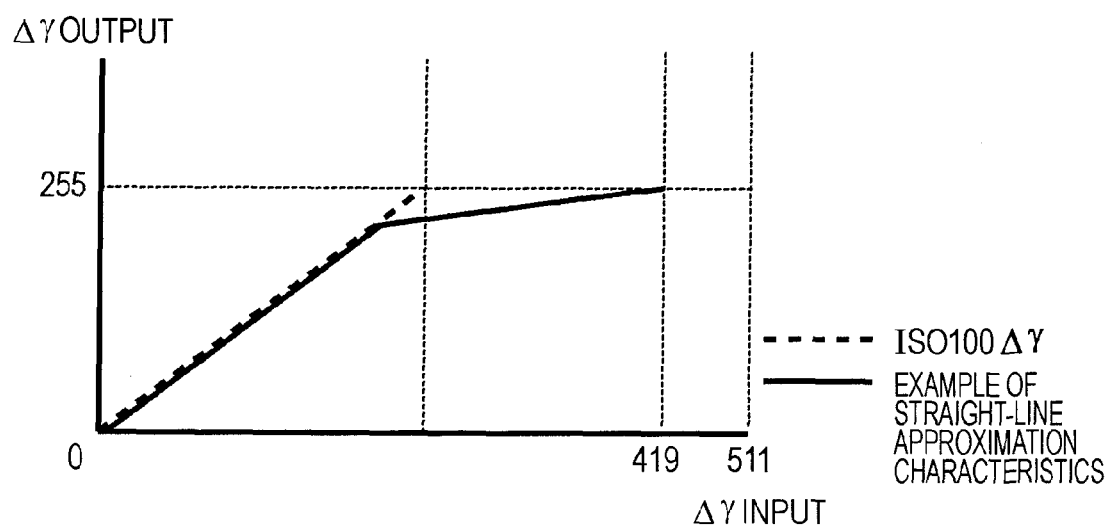
FIG. 11 shows an example of the structure of a straight-line-approximated Δγ curve.

On the other hand, when gradation conversion for high sensitivity is to be performed, in addition to a usual RGB γ table, a Δγ table for use in the Δγ correction section 12 needs to be provided, and the circuit size is increased. Accordingly, if the Δγ curve shown in FIG. 8 is replaced with straight-line-approximated characteristics as indicated by a solid line in FIG. 11, it is possible for the Δγ correction section 12 to perform gradation conversion of the luminance signal by simple function calculations without referring to the Δγ table. Therefore, the circuit size can be reduced.

Figure 12:
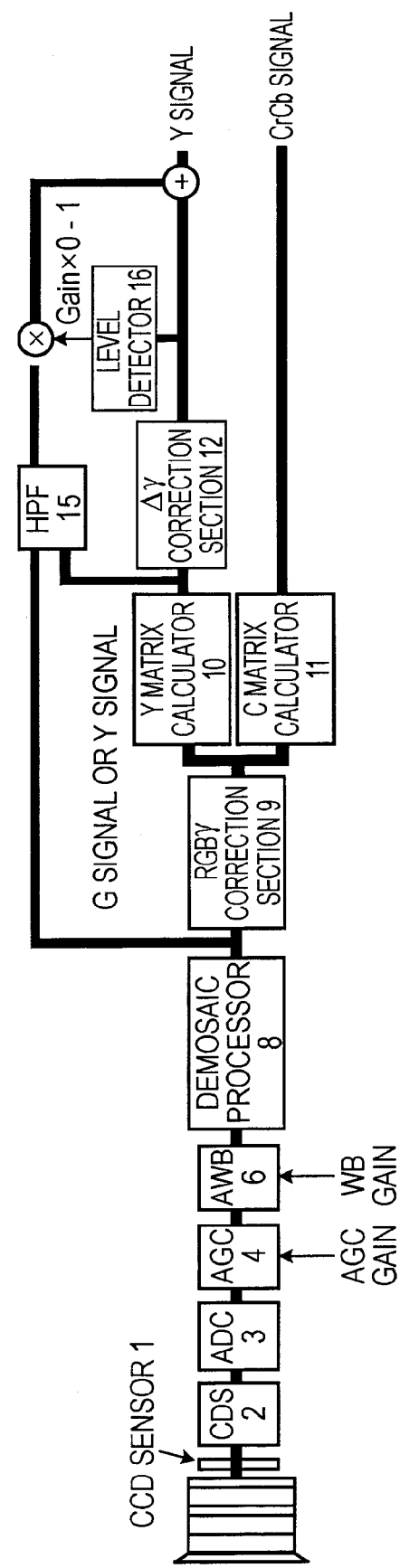
FIG. 12 shows the configuration of an image signal processing apparatus configured to compensate for resolution characteristics of a high luminance by performing aperture compensation.

When a wide dynamic range signal is gradation-converted into 8 bits of the output format as in this embodiment, gradation feeling on the high-luminance side is insufficient. However, for example, by performing aperture compensation, it is possible to compensate for resolution characteristics of a high luminance. FIG. 12 shows the configuration of an image signal processing apparatus in this case.

One or both of the G signal before RGB γ correction and the luminance signal Y from the RGB image signal generated by the Y matrix section 10 are input to a high-pass filter (HPF) 15, whereby a high-frequency signal is obtained. The HPF 15 is formed of, for example, a −1, 2-1, 3 TAP filter or the like.

Figure 13:
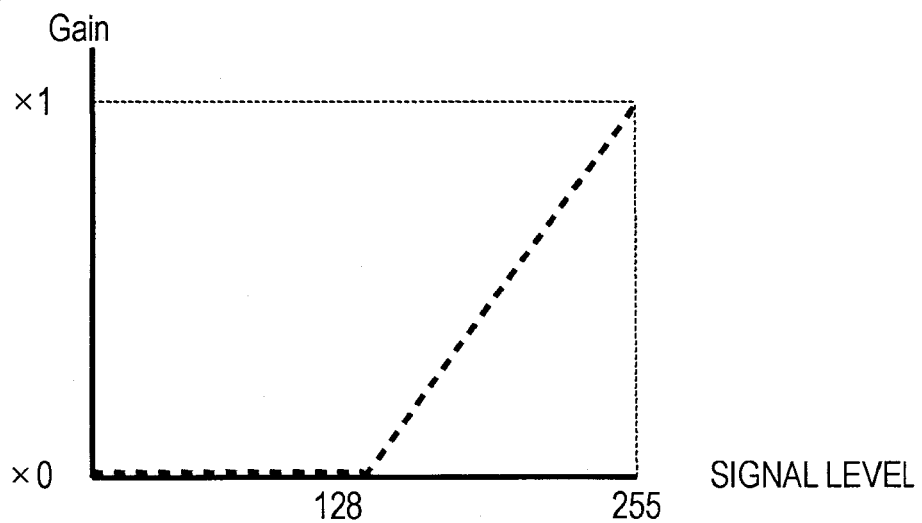
FIG. 13 shows output characteristics of a level detector 16.

The level detector 16 inputs a luminance signal Y after Δγ correction is performed, detects a portion where a change point at which the Δγ curve changes to a curve with which gradation compression is performed is exceeded. In the portion lower than or equal to the change point, the gain value is set to 0, and in the portion exceeding the change point, a gain value of 0 to 1 corresponding to the luminance signal level is output. The output characteristics of the level detector 16 are shown in FIG. 13.

Figure 14:
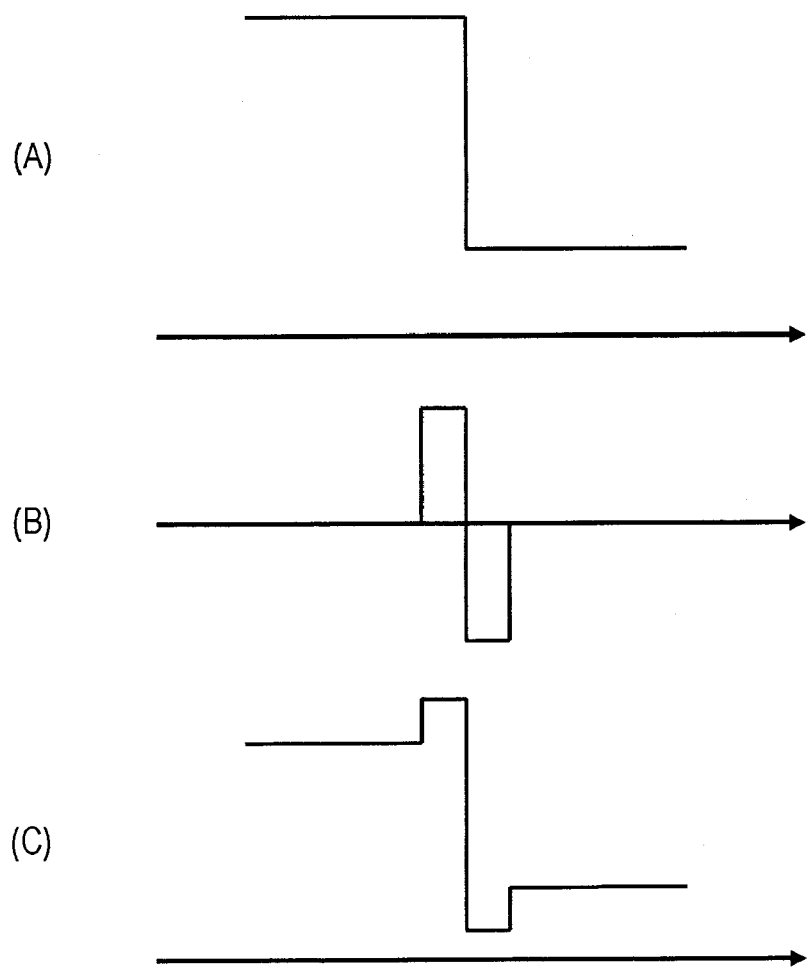
FIG. 14 illustrates resolution characteristics of a high luminance when high-frequency compensation by aperture compensation is performed on a luminance signal.

Then, the output of the HPF 15 and the gain value from the level detector 16 are multiplied together to generate a high-frequency compensation signal. This signal is added to the luminance signal Y after gradation conversion, which is output by the Δγ correction section 12, and a final luminance signal Y is obtained. This makes it possible to superpose the edge portion in the high-luminance region to the luminance signal and possible to compensate for the resolution characteristics of the high luminance. For example, if the edge in the high-luminance region is formed as shown in FIG. 14(A), a high-frequency compensation signal shown in FIG. 14(B) is generated. When these are added together, a luminance signal containing pulse components in the edge portion is formed as shown in FIG. 14(C). Even if gradation compression is performed, the edge becomes easy to remain.

In FIG. 12, a high-frequency compensation signal is added to the output of the $\Delta\gamma$ correction section 12. Also, if a high-frequency compensation signal is added to the luminance signal before $\Delta$ correction, similar advantages can be obtained.

Figure 15:
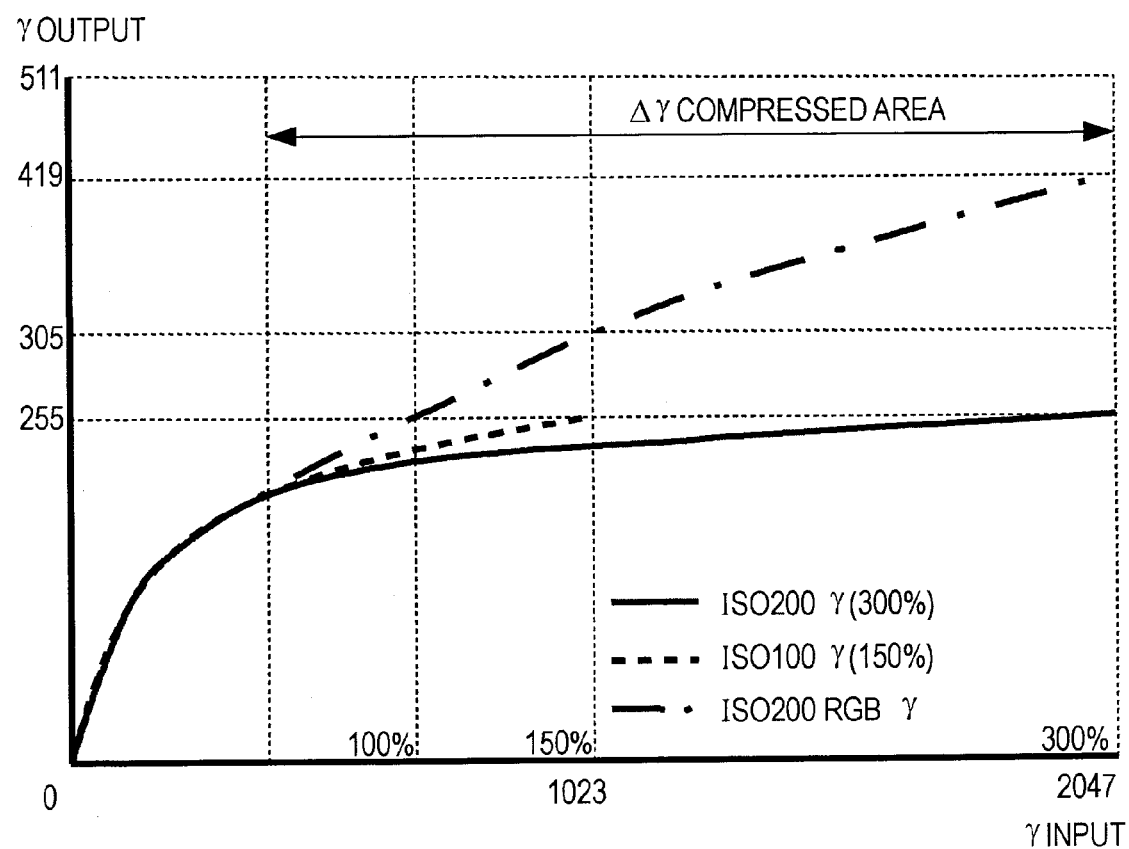
FIG. 15 shows characteristics of final 255-gradation compression output by an RGB γ correction section 9.

FIG. 15 shows $\gamma$ input of 1023 gradations at ISO 100, in which $\gamma$ correction characteristics (refer to FIG. 7) that are bit-expanded by the RGB $\gamma$ correction section 9 and $\Delta\gamma$ correction characteristics (refer to FIG. 8) with which the $\Delta\gamma$ correction section 12 performs $\Delta\gamma$ correction so that the luminance signal is fit into 8 bits of the output format are integrated, and characteristics of final 255 gradation compression output with respect to $\gamma$ input of 2047 gradations at ISO 200.

In FIG. 15, a $\gamma$ curve when ISO 100 is set is indicated with a dotted line. Furthermore, $\gamma$ output by the RGB $\gamma$ correction section 9 when ISO 200 is set is indicated with a short dashed line. As has already been described, in the RGB $\gamma$ curve, a high-luminance region subsequent to a place, which is a reference, where the image-plane formation $\gamma$ curve changes to a $\gamma^{1/2.2}$ curve, becomes a $\Delta\gamma$ compressed region. As a result of gradation conversion being performed by $\Delta\gamma$ correction in the designated region, characteristics of final 255 gradation compression output, which are indicated with a solid line, can be obtained.

The luminance signal Y is computed on the basis of RGB $\gamma$ correction output of 9 bits in accordance with equation (1) above, and is compressed to 8 bits of the output format by applying the above-described $\Delta\gamma$ correction.

On the other hand, color-difference signals are computed on the basis of RGB $\gamma$ correction output of 9 bits in accordance with equations (2) and (3) above, and the calculation results are clipped to 8 bits and output as color-difference signals.

In the RGB $\gamma$ correction of the related art in which 8-bit $\gamma$ output is made with respect to 8-bit $\gamma$ input, due to the fact that an image-plane formation $\gamma$ curve is separated from a power $\gamma$ (refer to FIG. 6) and due to an RGB $\gamma$ curve and clipping in a color difference matrix, there are problems in that color hue rotation and color blown out occur.

In comparison, in image signal processing according to this embodiment, by generating 8-bit color-difference signals on the basis of RGB $\gamma$ correction output of 9 bits by using a power $\gamma$ ($\gamma^{1/2.2}$), color-difference matrix clipping is difficult to apply due to the expansion of high-order bits riding on the power $\gamma$. Therefore, it is possible to greatly improve color-difference clipping and color hue rotation in a high-luminance region.

As a result of installing the above-described image signal processing apparatus into a digital camera, by setting an appropriate output signal level of a solid-state image-capturing device for each sensitivity setting and by using the output range that is originally possessed by the solid-state image-capturing device, it is possible to widen the dynamic range and also possible to reduce color hue rotation in the vicinity of the amount of the saturation electric charge.

However, gradation conversion for high sensitivity such that bits of RGB $\gamma$ correction output are expanded and $\Delta\gamma$ correction is further applied to the luminance signal causes system control load to increase more than that of a normal gradation conversion. Accordingly, by applying gradation conversion for high sensitivity only when a still image is to be captured and by not applying this gradation conversion during real-time monitoring (image confirmation) in which finder output is made only, the system control load may be reduced.

Figure 16:
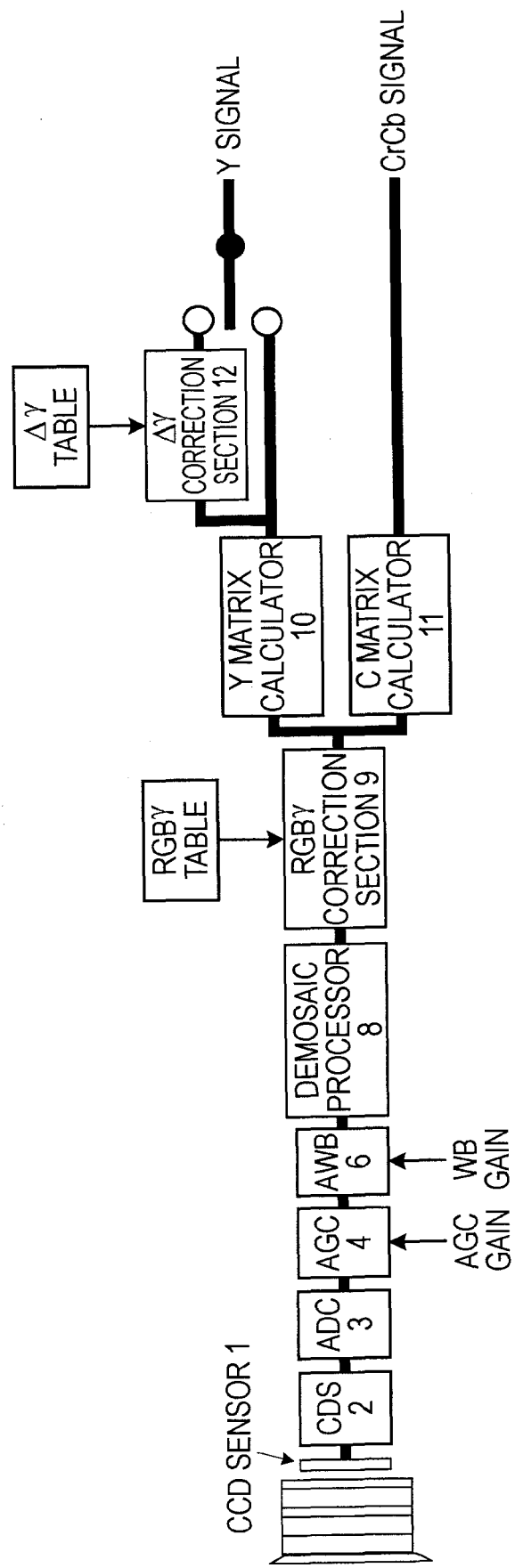
FIG. 16 shows an example of the configuration of an image signal processing apparatus in which gradation conversion for high sensitivity is applied only when a still image is to be captured.

FIG. 16 shows an example of the configuration of an image signal processing apparatus in this case. As shown in FIG. 16, selection means for selecting one of the output of the Y matrix calculator 10 and the output of the $\Delta\gamma$ correction section 12 is provided at the output end of the luminance signal Y. In the monitoring mode, the former is selectively output, and when a still image is to be captured, the latter is selectively output. In the monitoring mode, $\Delta\gamma$ correction is not applied, and the luminance signal to be output is clipped at 255 gradations, and the information on the high-luminance portion is lost. However, since an image is not stored, no particular problem is posed even if the reduction in the system control load takes a higher priority.

INDUSTRIAL APPLICABILITY

The present invention has thus been described in detail while referring to a specific embodiment. It is self-explanatory that modifications and substitutions of the embodiment may be made without departing from the spirit and scope of the present invention by a person skilled in the art.

In this specification, $\gamma$ correction has been described by using, as an example, $\gamma2.2$, which is common in a television signal of NTSC (National Television System Committee) or the like. However, the gist of the present invention is not limited to this example. For example, by applying the present invention in other formats, such as sRGB and Adobe RGB, similar advantages can be obtained.

In this specification, an example has been used in which the dynamic range is expanded to 2047 gradations of 200% at ISO 200 as the high sensitivity mode of a digital camera. In addition, by changing the $\gamma$ curve each time ISO sensitivity is increased, the dynamic range can be widened. Theoretically, the dynamic range can be improved in an amount corresponding to gain increase like 4095 gradations of 400% at ISO 400, hereafter similarly like 8191 gradations at ISO 800 and 16383 gradations at ISO 1600. However, the signal level subsequent to an AGC amplifier needs to be ensured and also, a larger RGB $\gamma$ table needs to be provided.

Figure 19A:
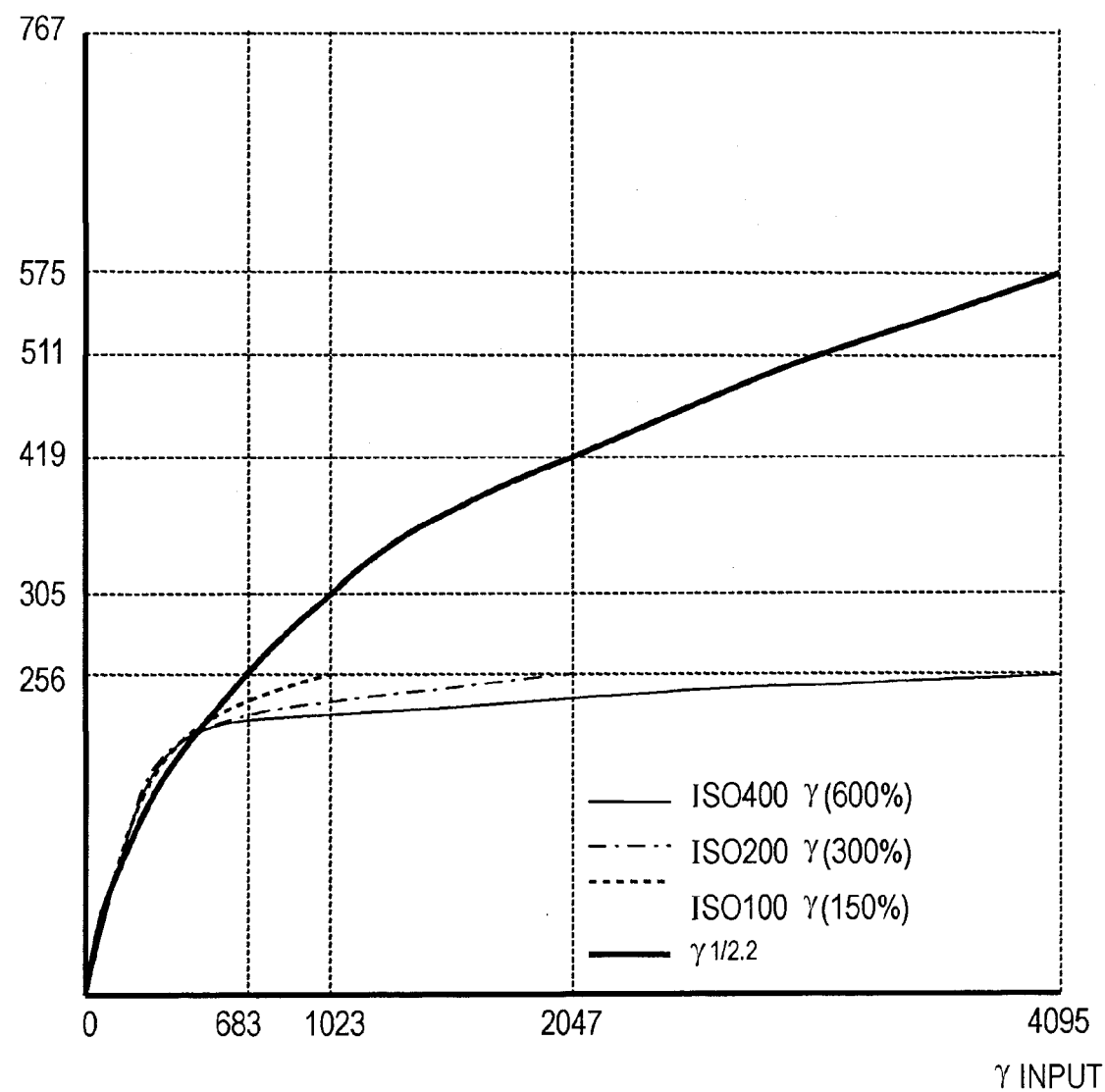
FIG. 19A shows total γ characteristics of Y luminance signal output by sensitivity of ISO 100, ISO 200, and ISO 400.
Figure 19B:
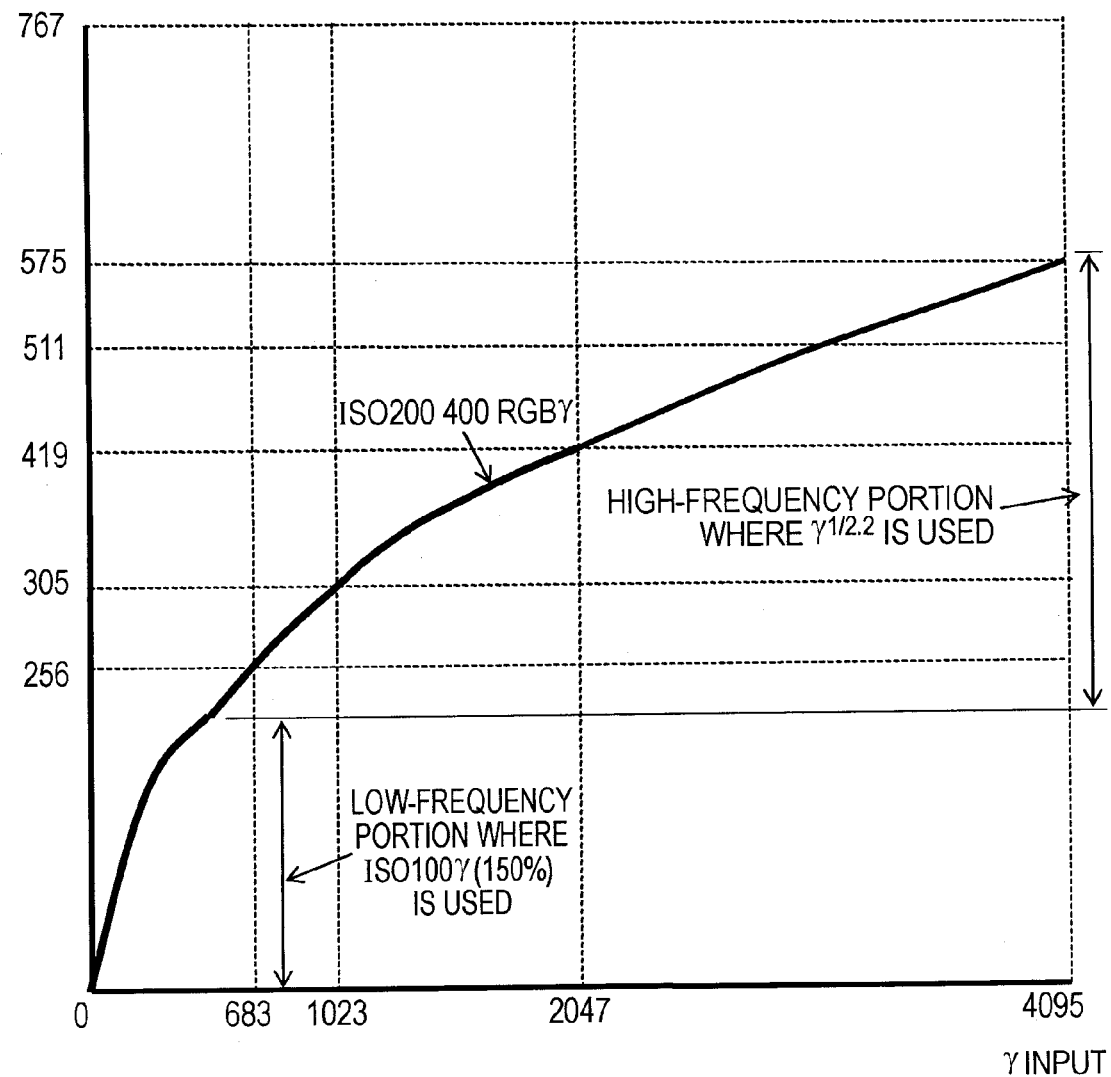
FIG. 19B shows an RGB γ curve of ISO 200 400 for forming an image plane, in which a γ curve of ISO 100 is used in a low-frequency region and a $\gamma^{1/2.2}$ curve is used in a high-frequency region subsequent to the intersection with the $\gamma^{1/2.2}$ curve.

FIG. 19A shows total $\gamma$ characteristics of Y luminance signal output by sensitivity of ISO 100, ISO 200, and ISO 400. When a dynamic range setting of 150% is set at the minimum ISO sensitivity 100, bits are expanded by gain increase at ISO 400. For this reason, a signal having a dynamic range of four times (600%) that at ISO 100 becomes input of RGB $\gamma$ correction. An RGB $\gamma$ curve that is 575 gradations, in which the bit length is expanded due to the output is 8 bits, that is, 255 gradations, is applied to the input signal. Then, by using $\gamma^{1/2.2}$ in the high-luminance portion, color hue rotation is reduced, and the dynamic range is ensured. The image-plane formation $\gamma$ curve that is the same as that of ISO 100 is used from the low luminance to the medium luminance, so that the contrasts are matched. FIG. 19B shows an RGB $\gamma$ curve of ISO 200 400 for forming an image plane, in which a $\gamma$ curve of ISO 100 is used in a low-frequency region and a $\gamma1/2.2$ curve is used in a high-frequency region subsequent to the intersection with the $\gamma1/2.2$ curve.

Figure 20:
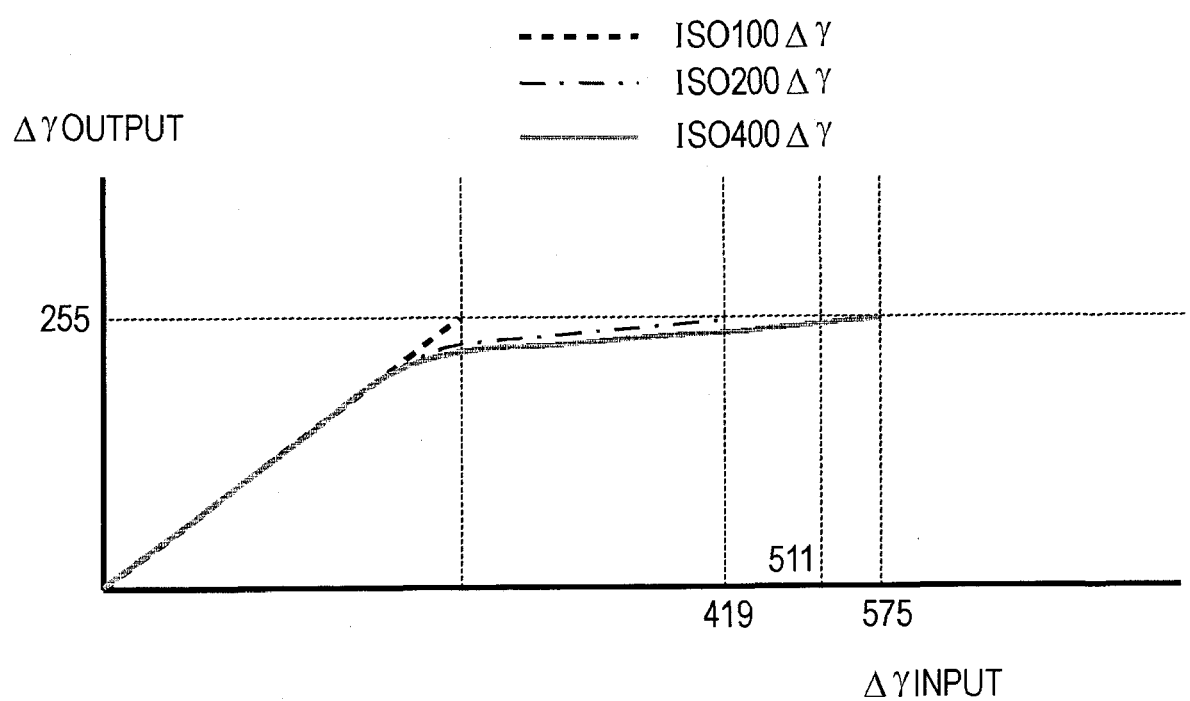
FIG. 20 shows an example of the structure of a Δγ correction curve used to adjust the output bit length of a luminance signal when ISO 400 is set.

A luminance signal is computed on the basis of the RGB $\gamma$ correction output in accordance with equation (1) above. At ISO 400, since RGB $\gamma$ correction output is 575 gradations, it is necessary to apply $\Delta\gamma$ correction to the RGB $\gamma$ correction output so as to be compressed to 8 bits of the output format. As shown in FIG. 20, with regard to an RGB $\gamma$ curve, the $\Delta\gamma$ correction curve in this case is drawn to be a straight-line form in which Δγ correction input is directly output without change for the region formed by an image-plane formation γ curve from a low luminance to a medium luminance and is drawn to be a curve in which compression is performed so as to fit into 255 gradations in a high-luminance region subsequent to a place, which is a reference, where the image-plane formation γ curve changes to the $\gamma^{1/2.2}$ curve. This makes it possible to ensure the dynamic range while the gradation of the high-luminance portion is maintained.

In summary, the present invention has been disclosed in the form of examples, and should not be construed as being limited thereto. In order to determine the gist of the present invention, the claims should be taken into consideration.

The invention claimed is:

1. An image signal processing apparatus for outputting a luminance signal and color-difference signals of a predetermined output bit length on the basis of a captured image of a subject, the image signal processing apparatus comprising:
   image signal input means for inputting an image signal such that an image of the subject is captured;
   amplifying means for expanding a dynamic range of the input image signal;
   means for computing an RGB signal on the basis of the image signal in which the dynamic range is expanded;
   RGB γ correction means for performing RGB γ correction on an RGB signal and outputting the signal such that bits are expanded more than the output bit length;
   conversion means for computing a luminance signal and color-difference signals on the basis of the RGB signal such that bits are expanded by the RGB γ correction means; and
   non-linear correction means for performing non-linear correction so that a computed output level of the luminance signal is fit into the output bit length.

2. The image signal processing apparatus according to claim 1, wherein the image input means further comprises:
   sensitivity setting means for inputting the image signal such that the image is captured by a solid-state image-capturing device and for setting a sensitivity of the input image signal, wherein
   the image signal whose dynamic range is expanded contains an output range on a high-luminance side, which occurs due to gain increase when a high sensitivity is set by the sensitivity setting means.

3. The image signal processing apparatus according to claim 2, wherein the RGB γ correction means
   uses an RGB γ curve for low sensitivity, with which output in accordance with the output bit length is performed, when a low sensitivity is set by the sensitivity setting means, and
   uses an RGB γ curve for high sensitivity in accordance with the RGB γ curve for low sensitivity from a low luminance to a medium luminance and having a curve in accordance with a power γ in a high-luminance region when a high sensitivity is set by the sensitivity setting means in order to output a signal such that bits are expanded more than the output bit length.

4. The image signal processing apparatus according to claim 3, wherein the non-linear correction means performs, with regard to an RGB γ curve, gradation conversion of a luminance signal by using a non-linear correction curve that is formed to be in a straight-line form in which input to the non-linear correction means is directly used as output of the non-linear correction means in a region formed by an image-plane formation γ curve from a low luminance to a medium luminance and that is formed to be a curve so as to fit into 255 gradations in a high-luminance region subsequent to a point where the image-plane formation γ curve changes to a power γ curve.

5. The image signal processing apparatus according to claim 3, further comprising:
   histogram detection means for histogram-detecting a luminance signal and determining a luminance region where a histogram is concentrated; and
   non-linear correction curve generation means for adaptively generating a non-linear correction curve so as to moderate a degree of gradation compression in the luminance region where the histogram is concentrated, wherein
   the non-linear correction means performs gradation conversion of the luminance signal in accordance with a non-linear correction curve supplied from the non-linear correction curve generation means.

6. The image signal processing apparatus according to claim 3, wherein the non-linear correction means performs, with regard to an RGB γ curve, gradation conversion of a luminance signal by using a non-linear correction curve that is formed to be in a straight-line form in which input to the non-linear correction means is directly used as output of the non-linear correction means in a region formed by an image-plane formation γ curve from a low luminance to a medium luminance and that is straight-line-approximated so as to fit into 255 gradations in a high-luminance region subsequent to a point where the image-plane formation γ curve changes to a power γ curve.

7. The image signal processing apparatus according to claim 4, further comprising:
   a high-pass filter for obtaining a high-frequency signal from at least one of a luminance signal computed on the basis of a G signal before RGB γ correction by the RGB γ correction means and an RGB signal before γ correction, and a luminance signal computed from a γ conversion output signal;
   luminance signal level detection means for inputting a luminance signal Y after or before non-linear correction is performed, detecting a portion exceeding a change point at which the non-linear correction curve changes from a straight line to a curve with which gradation conversion is performed, setting a gain value to 0 in a portion lower than or equal to the change point, and outputting a gain value of 0 to 1 corresponding to the luminance signal level in a portion higher than the change point; and
   high-luminance resolution characteristic compensation means for generating a high-frequency compensation signal by multiplying the output of the high-pass filter with the gain value from the level detection means and adding the high-frequency compensation signal to the luminance signal.

8. The image signal processing apparatus according to claim 1, further comprising:
   selection output means for outputting a luminance that is gradation-converted by the non-linear correction means so as to be fit into the output bit length in a still-image-capturing mode, and for directly outputting a luminance signal that is generated by the conversion means in a monitoring mode, the selection output means being installed for use in an image-capturing apparatus having a still-image-capturing mode and the monitoring mode for confirming an image.

9. An image signal processing method for use with an image signal processing apparatus for outputting a luminance signal and color-difference signals of a predetermined output bit length on the basis of a captured image of a subject, the image signal processing method comprising:

inputting an image signal such that an image of the subject is captured;

setting a sensitivity of the input image signal;

expanding, via an automatic gain control amplifier, the dynamic range of the input image signal to output an image signal having an amount of bits based on the sensitivity of the input image signal;

computing an RGB signal on the basis of the image signal whose dynamic range is expanded;

performing RGB γ correction on the RGB signal and outputting a signal such that bits are expanded more than the output bit length;

computing a luminance signal and color-difference signals on the basis of the RGB signal such that bits are expanded in the RGB γ correction step; and performing non-linear correction so that the computed output level of the luminance signal is fit into the output bit length.

10. The image signal processing method according to claim 9, wherein the expanding further includes expanding the range of an image signal which contains an output range on a high-luminance side, which occurs due to gain increase when a high sensitivity is set in the sensitivity setting step.

11. The image signal processing method according to claim 10, wherein the performing RGB γ correction further includes performing RGB γ correction on an RGB γ curve for low sensitivity with output in accordance with the output bit length when a low sensitivity is set by the sensitivity setting step, and performing RGB γ correction on an RGB γ curve for high sensitivity in accordance with the RGB γ curve for low sensitivity from a low luminance to a medium luminance and having a curve in accordance with a power γ in a high-luminance region when a high sensitivity is set by the sensitivity setting step in order to output a signal such that bits are expanded more than the output bit length.

12. An image signal processing apparatus for outputting a luminance signal and color-difference signals of a predetermined output bit length on the basis of a captured image of a subject, the image signal processing apparatus comprising:

an image signal input section to input an image signal such that an image of the subject is captured, the image signal input section including a sensitivity setting section to set a sensitivity of the input image signal;

an automatic gain control amplifier configured to expand a dynamic range of the input image signal to output an image signal having an amount of bits based on the sensitivity of the input image signal;

a computing section to compute an RGB signal on the basis of an image signal in which the dynamic range is expanded;

a RGB γ correction section to perform RGB γ correction on the RGB signal and to output the signal such that bits are expanded more than the output bit length;

a conversion section to compute a luminance signal and color-difference signals on the basis of the RGB signal such that bits are expanded by the RGB γ correction section; and a non-linear correction section to perform non-linear correction so that the computed output level of the luminance signal is fit into the output bit length.

13. The image signal processing apparatus according to claim 12, wherein the image signal whose dynamic range is expanded contains an output range on a high-luminance side, which occurs due to gain increase when a high sensitivity is set by the sensitivity setting section.

14. The image signal processing apparatus according to claim 13, wherein the RGB γ correction section uses an RGB γ curve for low sensitivity, with which output in accordance with the output bit length is performed, when a low sensitivity is set by the sensitivity setting section, and a RGB γ curve for high sensitivity in accordance with the RGB γ curve for low sensitivity from a low luminance to a medium luminance and having a curve in accordance with a power γ in a high-luminance region when a high sensitivity is set by the sensitivity setting section in order to output a signal such that bits are expanded more than the output bit length.

* * * * *